United States Patent
Siomina et al.

(10) Patent No.: US 12,200,517 B2
(45) Date of Patent: Jan. 14, 2025

(54) METHODS OF CONTROLLING ADAPTIVE UE BEAM MEASUREMENT CAPABILITY

(71) Applicant: Telefonaktiebolaget LM Ericsson (publ), Stockholm (SE)

(72) Inventors: Iana Siomina, Täby (SE); Muhammad Kazmi, Sundbyberg (SE); Christopher Callender, Kinross (GB)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/055,165

(22) PCT Filed: May 14, 2019

(86) PCT No.: PCT/SE2019/050431
§ 371 (c)(1),
(2) Date: Nov. 13, 2020

(87) PCT Pub. No.: WO2019/221660
PCT Pub. Date: Nov. 21, 2019

(65) Prior Publication Data
US 2021/0227409 A1      Jul. 22, 2021

Related U.S. Application Data

(60) Provisional application No. 62/671,127, filed on May 14, 2018.

(51) Int. Cl.
H04W 24/08     (2009.01)
H04W 72/044    (2023.01)
H04W 72/542    (2023.01)

(52) U.S. Cl.
CPC ......... *H04W 24/08* (2013.01); *H04W 72/046* (2013.01); *H04W 72/542* (2023.01)

(58) Field of Classification Search
CPC . H04W 24/08; H04W 72/046; H04W 72/085; H04B 7/0617; H04B 7/0619;
(Continued)

(56) References Cited

U.S. PATENT DOCUMENTS

2011/0310753 A1* 12/2011 Chou ............... H04W 48/16
                                               370/252
2014/0177601 A1*  6/2014 Nishio ............ H04W 52/146
                                               370/332
(Continued)

FOREIGN PATENT DOCUMENTS

CN   106304354 A   1/2017
CN   107889130 A   4/2018
(Continued)

OTHER PUBLICATIONS

ETSI TS 138 331 v15.3.0; Technical Specification; 5G; NR; Radio Resource Control (RRC); Protocol specification (3GPP TS 38.331 version 15.3.0 Release 15)—Oct. 2018.
(Continued)

*Primary Examiner* — Jae Y Lee
*Assistant Examiner* — Hector Reyes
(74) *Attorney, Agent, or Firm* — Weisberg I.P. Law, P.A.

(57) ABSTRACT

A method by a wireless device is provided for controlling adaptive beam measurement capability. The method includes identifying a type of serving carrier of a serving cell and allocating at least one resource for beam measurement based on the type that was identified.

14 Claims, 21 Drawing Sheets

(58) Field of Classification Search
CPC ..... H04L 5/0023; H04L 5/0048; H04L 5/005; H04L 5/001
See application file for complete search history.

(56) References Cited

U.S. PATENT DOCUMENTS

| | | | |
|---|---|---|---|
| 2015/0163041 A1* | 6/2015 | Kodali | H04L 5/0041 370/252 |
| 2016/0227462 A1* | 8/2016 | Axmon | H04B 7/0842 |
| 2017/0026938 A1* | 1/2017 | Onggosanusi | H04L 5/0053 |
| 2017/0055187 A1* | 2/2017 | Kang | H04W 36/0058 |
| 2017/0171768 A1* | 6/2017 | Kim | H04W 76/28 |
| 2017/0208494 A1* | 7/2017 | Moon | H04L 5/0048 |
| 2019/0052378 A1* | 2/2019 | Yiu | H04B 7/0695 |
| 2019/0116530 A1* | 4/2019 | Da Silva | H04W 36/0094 |
| 2020/0322023 A1* | 10/2020 | Kung | H04B 7/0626 |
| 2021/0058913 A1* | 2/2021 | Jang | H04W 16/28 |
| 2021/0091827 A1* | 3/2021 | Namba | H04B 17/309 |

FOREIGN PATENT DOCUMENTS

| | | |
|---|---|---|
| WO | 2017 196491 A1 | 11/2017 |
| WO | 2018 083377 A1 | 5/2018 |

OTHER PUBLICATIONS

Examination Report issued by Intellectual Property India for Application No. 202047053517—Dec. 17, 2021.
3GPP TS 38.331 v15.1.0; Technical Specification; 3rd Generation Partnership Project; Technical Specification Group Radio Access Network; NR; Radio Resource Control (RRC) protocol specification (Release 15)—Mar. 2018.
3GPP TSG-RAN WG4 Meeting #86bis; Melbourne, Australia; Source: Ericsson; Title: On measurement capability for 33B based measurements (R4-1804704)—Apr. 16, 2020, 2018.
PCT International Search Report issued for International application No. PCT/SE2019/050431—Aug. 9, 2019.
PCT Written Opinion of the International Searching Authority issued for International application No. PCT/SE2019/050431—Aug. 9, 2019.
EPO Communication dated Apr. 18, 2023 for Patent Application No. 19727750.2, consisting of 4-pages.
Indian Hearing Notice dated Mar. 11, 2024 for Patent Application No. 202047053517, consisting of 2 pages.

* cited by examiner

Non-Centralized

Co-sited

Centralized

Shared

METHODS OF CONTROLLING ADAPTIVE UE BEAM MEASUREMENT CAPABILITY

PRIORITY

This nonprovisional application is a U.S. National Stage Filing under 35 U.S.C. § 371 of International Patent Application Serial No. PCT/SE2019/050431 filed May 14, 2019 and entitled "Methods of Controlling Adaptive UE Beam Measurement Capability" which claims priority to U.S. Provisional Patent Application No. 62/671,127 filed May 14, 2018 both of which are hereby incorporated by reference in their entirety.

BACKGROUND

From a radio perspective, the 5G system started to be standardized in 3GPP, and New Radio (NR) is the name for the radio interface. One of the characteristics of NR is the ability to use higher frequency ranges than those used by Long Term Evolution (LTE). For example, frequency ranges above 6 GHz are enabled. However, these higher frequency ranges are known to have more challenging propagation conditions such as a higher penetration and path loss. To mitigate some of these effects, multi-antenna technologies such as beamforming will be massively used. Yet another NR characteristic is the use of multiple numerologies in downlink (DL) and uplink (UL) in a cell or for a user equipment (UE) and/or in different frequency bands. Yet another characteristic is the possibility to enable shorter latencies.

Both standalone and non-standalone NR deployments have been standardized in 3GPP. The standalone deployments may be single or multi-carrier (e.g., NR carrier aggregation (CA) or dual connectivity (DC) with NR primary cell (PCell) and NR primary secondary cell (PSCell)). The non-standalone deployments are currently meant to describe a deployment with LTE PCell and NR PSCell. There may also be one or more LTE secondary cells (Scells) and one or more NR SCell.

The following deployment options are explicitly captured in NR Work Item Description, RP-170847, New WID on New Radio Access Technology, NTT DoCoMo, March 2018:

This work item is aimed at supporting the following connectivity options:
  For single connectivity option:
    NR connected to 5G-CN (Option 2 in TR 38.801 section 7.1).
  For Dual Connectivity options:
    E-UTRA-NR DC via EPC where the E-UTRA is the master (Option 3/3a/3x in TR 38.801 section 10.1.2);
    E-UTRA-NR DC via 5G-CN where the E-UTRA is the master (Option 7/7a/7x in TR 38.801 section 10.1.4);
    NR-E-UTRA DC via 5G-CN where the NR is the master (Option 4/4A in TR 38.801 section 10.1.3) Work on Option 4/4A will be started after the work on Option 2, 3 series and 7 series are completed.

In NR, DC can be between Evolved Universal Terrestrial Radio Access (E-UTRA) and NR (the master can be E-UTRA or NR while the secondary serving node can be NR and E-UTRA, respectively) and Dual Connectivity within NR only.

An NG-RAN node (or NR radio network node) is currently either:

a gNB, providing NR user plane and control plane protocol terminations towards the UE; or
an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the Access and Mobility Management Function (AMF) by means of the NG-C interface and to the User Plane Function (UPF) by means of the NG-U interface. This is discussed in more detail in 3GPP TS 23.501.

FIG. 1 illustrates the NG-RAN architecture, and FIG. 2 illustrates NR deployment examples.

With regard to measurements in NR, the UE measures at least one and possibly multiple beams of a cell. The measurements results, which may include power values, are averaged to derive the cell quality. In doing so, the UE is configured to consider a subset of the detected beams. Filtering takes place at two different levels: at the physical layer to derive beam quality and then at Radio Resource Control (RRC) level to derive cell quality from multiple beams. Cell quality from beam measurements is derived in the same way for the serving cell(s) and for the non-serving cell(s). Measurement reports may contain the measurement results of a number of X best beams if the UE is configured to do so by the gNB.

The measurement can be: intra-frequency (including radio link monitoring (RLM) and beam management), inter-frequency, and inter-radio access technology (inter-RAT). NR inter-RAT measurements are performed when the UE is connected to at least another radio access technology (RAT) such as, for example, E-UTRA, but the UE may at the same time be connected also to NR such as, for example, when the UE is in DC with E-UTRA or NR. Intra-frequency neighbour (cell) measurements and inter-frequency neighbour (cell) measurements are defined as follows:

Synchronization Signal Block (SSB) based intra-frequency measurement: a measurement is defined as an SSB based intra-frequency measurement provided the center frequency of the SSB of the serving cell and the center frequency of the SSB of the neighbour cell are the same, and the subcarrier spacing of the two SSBs is also the same.

SSB based inter-frequency measurement: a measurement is defined as an SSB based inter-frequency measurement provided the center frequency of the SSB of the serving cell and the center frequency of the SSB of the neighbour cell are different, or the subcarrier spacing of the two SSBs is different.

Channel State Information-Reference Signal (CSI-RS) based intra-frequency measurement: a measurement is defined as a CSI-RS based intra-frequency measurement provided the bandwidth of the CSI-RS resource on the neighbour cell configured for measurement is within the bandwidth of the CSI-RS resource on the serving cell configured for measurement, and the subcarrier spacing of the two CSI-RS resources is the same.

CSI-RS based inter-frequency measurement: a measurement is defined as a CSI-RS based inter-frequency measurement provided the bandwidth of the CSI-RS resource on the neighbour cell configured for measurement is not within the bandwidth of the CSI-RS resource on the serving cell configured for measurement, or the subcarrier spacing of the two CSI-RS resources is different.

In NR, a beam can be measured, for example, based on SSB, which may also be known as SS/PBCH block in 3GPP TS 38.211, CSI-RS, or their combination. CSI-RS is specified in 3GPP TS 38.211.

FIG. 3 illustrates the time-frequency structure of the synchronization signal and physical broadcast channel (PBCH) block. The synchronization signal and PBCH block consists of primary synchronization signals (PSS) and secondary synchronization signals (SSS), each occupying 1 symbol and 127 subcarriers, and PBCH spanning across 3 OFDM symbols and 240 subcarriers, but on one symbol leaving an unused part in the middle for SSS as shown in FIG. 3. The periodicity of the SS/PBCH block can be configured by the network and the time locations where SS/PBCH block can be sent are determined by sub-carrier spacing.

Polar coding is used for PBCH.

The UE may assume a band-specific sub-carrier spacing for the SS/PBCH block unless a network has configured the UE to assume a different sub-carrier spacing.

PBCH symbols carry its own frequency-multiplexed DMRS.

QPSK modulation is used for PBCH.

The PBCH physical layer model is described in 3GPP TS 38.202.

With regard to static UE beam measurement capability, in LTE and earlier 3GPP RATs, the UE was measuring cells and not different beams of the cell(s), therefore there was no UE beam measurement capabilities.

In NR, UE beam measurement capability has been discussed in terms of the number of beams per each cell (in combination with the total number of cells, so the number beams per cell times the number of cells defines the number of beams per carrier) and/or the total number of beams per carrier (without defining the per-cell beam measurement capability) without differentiating between the carriers. This capability is statically defined in the UE and does not depend on the current CA configuration or the number of configured carriers or coverage level.

In the context of beam measurement capability, it should be emphasized that the discussion is about the number of beams transmitted by the gNB (e.g. number of SSB and/or number of CSI-RS) which are measured by the UE. The UE may also use receive beamforming to perform measurements. However, the number of UE receive beams is generally understood to be a UE implementation matter which does not need to be standardized.

There currently exist certain challenge(s). For example, the UE beam measurement capability discussed so far is static and does not depend, for example, on the current CA configuration or the number of configured carriers in the UE.

In general, NR is a multi-beam operation system. UEs with a higher beam measurement capability benefit multi-beam system operation, but at the same time this introduces more complexity in the UE. It may increase the power consumption in the UE and increase the cost of the UE due to the increased measurement processing. Additionally, UE complexity and power consumption are increased when the UE is configured with multiple carriers such as, for example, in carrier aggregation and/or in multiple connectivity such as EN-DC. Thus, there is a need to find the best trade-off from the system and the UE point of view.

SUMMARY

To address the foregoing problems with existing solutions, disclosed is systems and methods for controlling adaptive beam measurement capability.

According to certain embodiments, a method by a wireless device is provided for controlling adaptive beam measurement capability. The method includes identifying a type of serving carrier of a serving cell and allocating at least one resource for beam measurement based on the type that was identified.

According to certain embodiments, a wireless device is provided for controlling adaptive beam measurement capability. The wireless device includes memory operable to store instructions and processing circuitry operable to execute the instructions to cause the wireless device to identify a type of serving carrier of a serving cell and allocate at least one resource for beam measurement based on the type that was identified.

According to certain embodiments, a method by a network node is provided for controlling an adaptive beam measurement capability of a wireless device. The method includes transmitting, to the wireless device, a configuration for performing one or more beam measurements based on a type of serving carrier of a serving cell and receiving information associated with the one or more beam measurements performed based on the configuration and the type of serving carrier.

According to certain embodiments, a network node is provided for controlling an adaptive beam measurement capability of a wireless device. The network node includes memory operable to store instructions and processing circuitry operable to execute the instructions to cause the network node to transmit, to the wireless device, a configuration for performing one or more beam measurements based on a type of serving carrier of a serving cell and receive information associated with the one or more beam measurements performed based on the configuration and the type of serving carrier.

Certain embodiments may provide one or more of the following technical advantages. For example, one technical advantage may be that certain embodiments provide the possibility to adapt a user equipment's beam measurements capability to its configuration, such as, for example, number of configured carriers for the measurements, number of configured component carriers (CCs), number of configured and activated CCs, number of configured but deactivated CCs, coverage level, user equipment (UE) activity level, etc.

Another technical advantage may be that certain embodiments optimize UE complexity, power consumption and processing. This may be especially true when the UE is configured with two or more carriers for measurements.

Still another technical advantage may be that certain embodiments may enhance the performance of procedures (e.g. mobility, beam management, scheduling etc.), which rely on beam measurements.

Yet another technical advantage may be that certain embodiments optimize the UE beam measurements capability depending on the UE configuration or coverage level, in order to compromise this UE capability when the measurements demand is becoming too high due to the UE's configuration.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
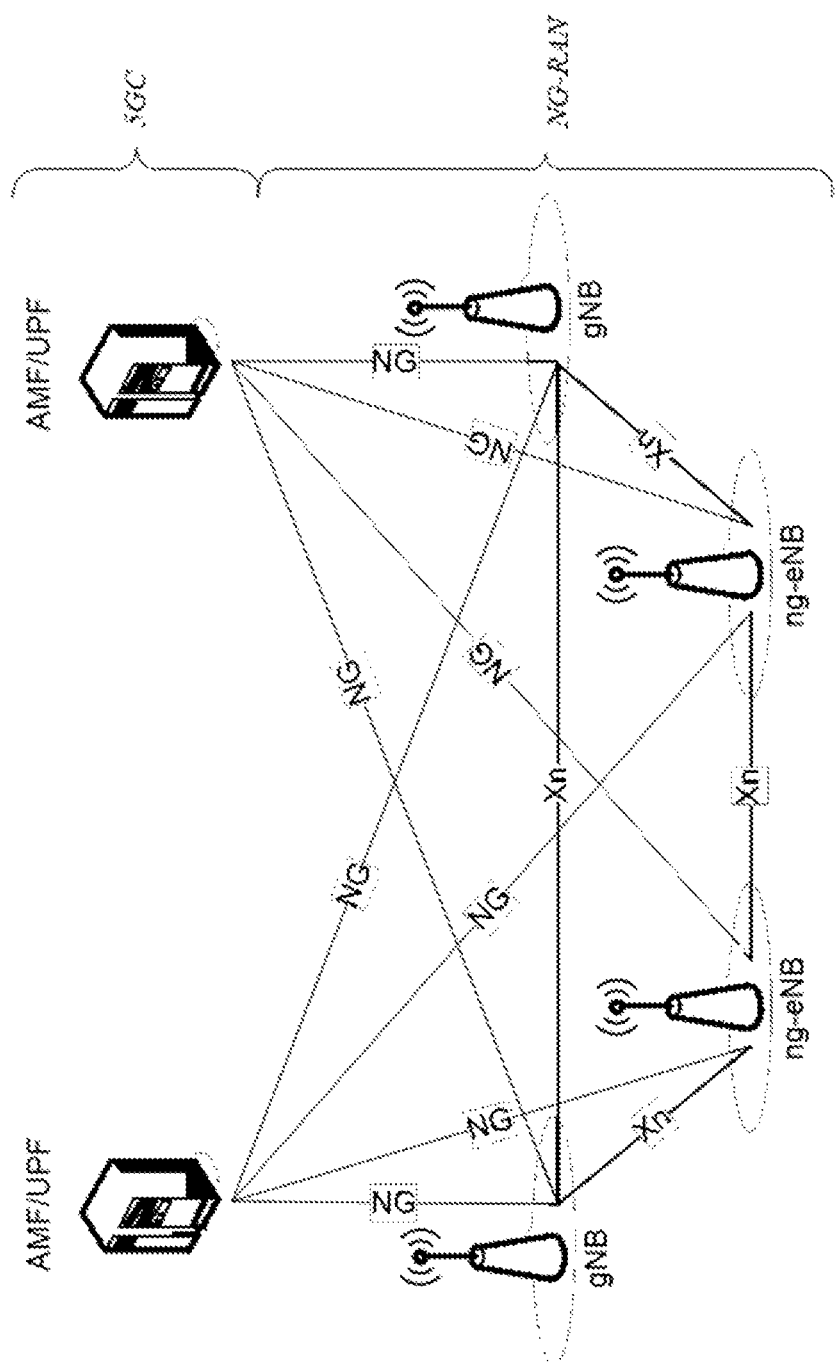
FIG. 1 illustrates the NG-RAN architecture.
Figure 2A:
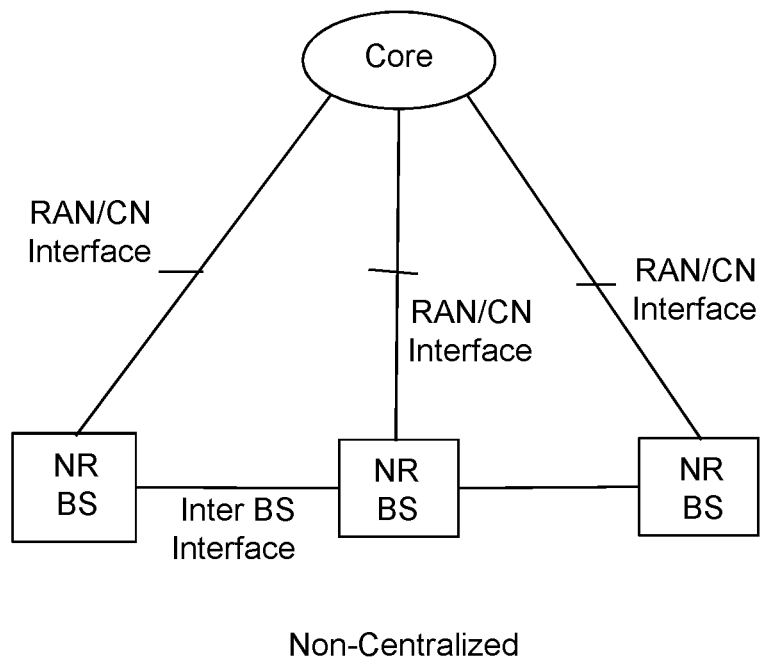
FIG. 2 illustrates NR deployment examples.
Figure 2A:
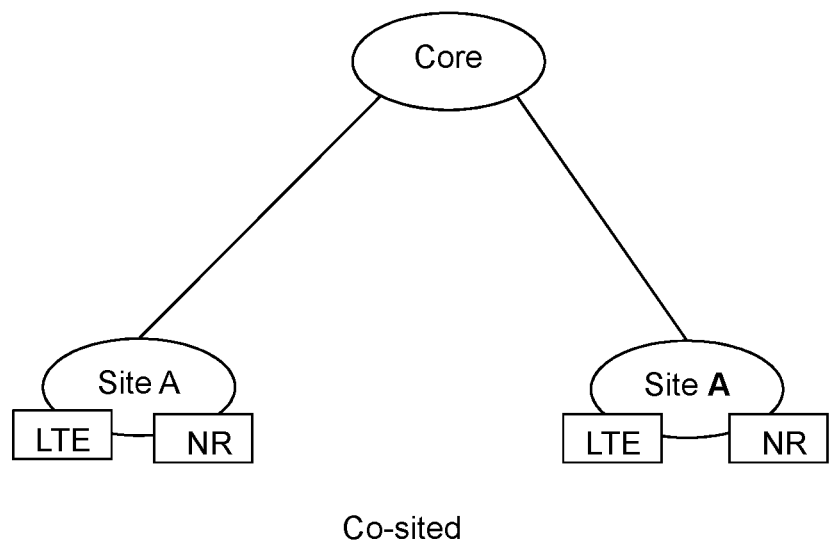
Figure 2B:
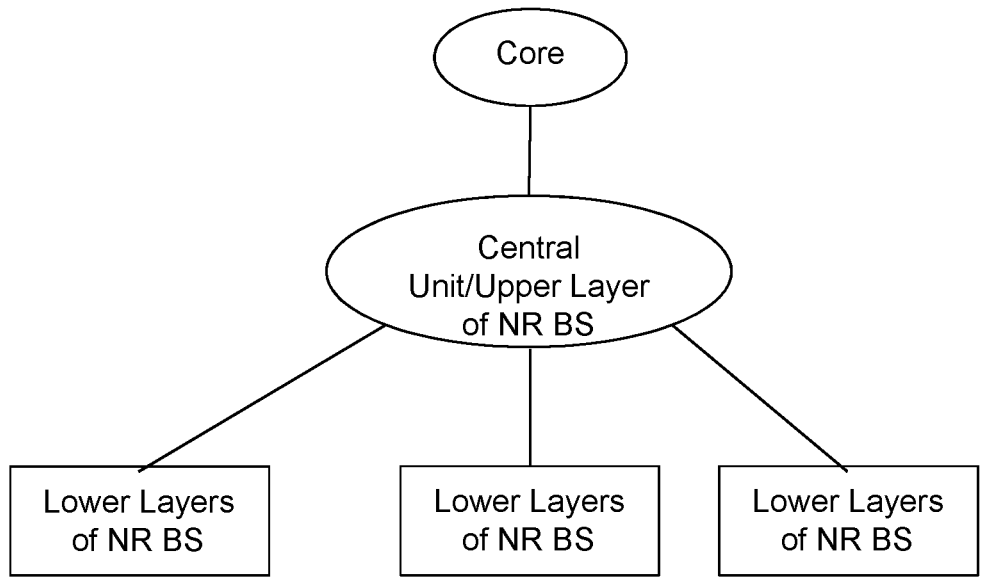
Figure 2B:
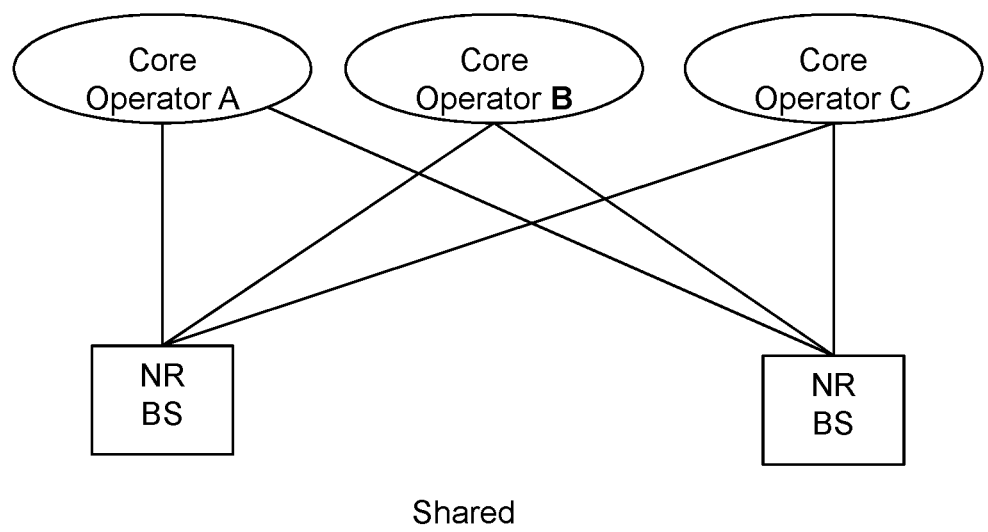
Figure 3:
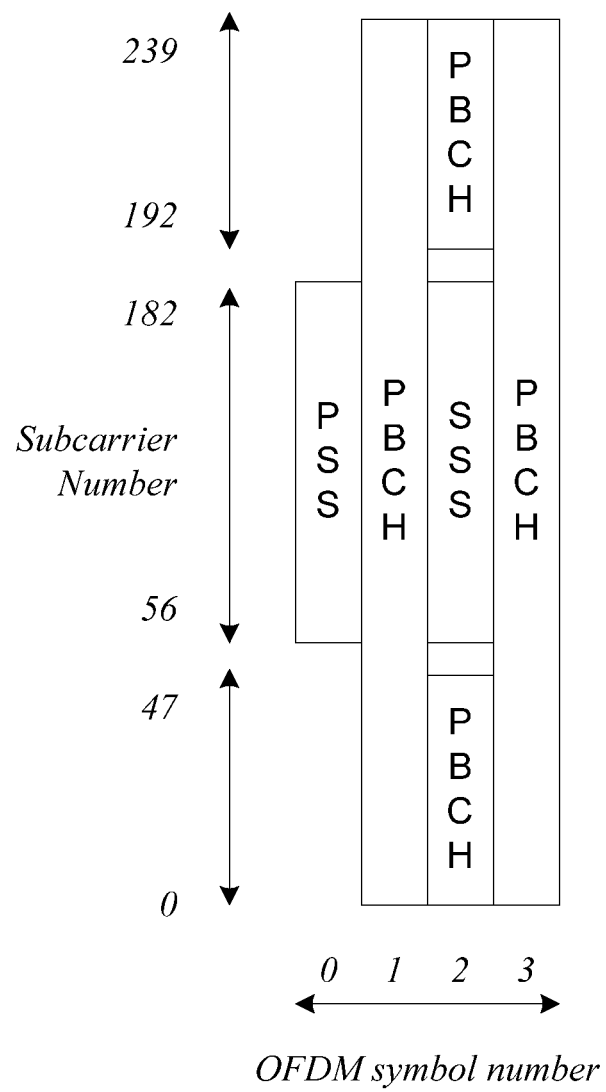
FIG. 3 illustrates the time-frequency structure of the synchronization signal and physical broadcast channel (PBCH) block.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. According to certain embodiments, In some embodiments, a more general term "network node" may be used and may correspond to any type of radio network node or any network node, which communicates with a user equipment (UE) (directly or via another node) and/or with another network node. Examples of network nodes are NodeB, master eNB (MeNB), slave eNB (SeNB), a network node belonging to master cell group (MCG) or slave cell group (SCG), base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), core network node (e.g. MSC, mobility management entity (MME), etc.), Operations & Maintenance (O&M), Operations Support System (OSS), Self-Organizing Network (SON), positioning node such as for example an Enhanced-Serving Mobile Location Center (E-SMLC), Minimization of Drive Test (MDT), test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, personal data assistant (PDA), PAD, Tablet, mobile terminals, smart phone, laptop embedded equipped (LEE), laptop mounted equipment (LME), Universal Serial Bus (USB) dongles, UE category M1, UE category M2, Proximity Services (ProSe) UE, vehicle-to-vehicle (V2V) UE, vehicle-to-anything (V2X) UE, etc.

The embodiments are described for NR. However, the embodiments are applicable to any radio access technology (RAT) or multi-RAT systems, where the UE receives and/or transmit signals (e.g. data) e.g. standalone NR, non-standalone NR, 5G, LTE frequency division duplex (FDD)/time division duplex (TDD), Wideband Code Division Multiple Access (WCDMA)/High Speed Packet Access (HSPA), Global Systems for Mobile (GSM)/GSM EDGE Radio Access Network (GERAN), Wi Fi, WLAN, CDMA2000, etc.

The term time resource used herein may correspond to any type of physical resource or radio resource expressed in terms of length of time. Examples of time resources are: symbol, mini-slot, time slot, subframe, radio frame, TTI, interleaving time, etc. The term TTI used herein may correspond to any period of time over which a physical channel can be encoded and interleaved for transmission. The physical channel is decoded by the receiver over the same period of time (TO) over which it was encoded. The TTI may also interchangeably called as short TTI (sTTI), transmission time, slot, sub-slot, mini-slot, short subframe (SSF), mini-subframe etc.

The embodiments described herein may apply to any RRC state, e.g., RRC_CONNECTED, RRC_IDLE, or INACTIVE.

The term beam used herein comprises any directional transmission or reception or their combination (e.g., when there is association in a node between a transmit beam and receive beam). This may be achieved by combining elements in an antenna array in such a way that signals at particular angles experience constructive interference (or gain) while others experience destructive interference (or loss). The signals/channels can be associated with a specific beam through its time-frequency resource or absolute or relative time-frequency resource location index (e.g., synchronization signal block (SSB) index or signal location index within a block; first SSB within a set of SSBs transmitted within SS/PBCH Block Measurement Time Configuration (SMTC) window corresponds to beam X, second SSB within a set of SSBs transmitted within SMTC window corresponds to beam Y, etc.) wherein a signal from a certain beam is transmitted in the corresponding time-frequency resources or a set of time-frequency resources, through its signal sequence which may be generated based on a beam index, through the beam-specific information (e.g., beam index, etc.) transmitted via the channel (e.g., PBCH may contain beam index information), etc. A beam may be characterized by or further associated with its identity (mapping to a certain beam or beam configuration), main beam direction (e.g., degrees in 2D or 3D space), coordinates characterizing the main beam direction as projected to the coordinates planes or a cube of a predefined dimension, transmission (TX) power, beam width, SSB index, frequency, etc.

UE beam measurement capability or beam measurement capacity is the UE's ability to handle a certain amount of beam measurements in parallel (e.g., over a certain time period or during one or more time resources), which in order to support such capability implies the ability of one or more of: allocating the necessary amount of memory or buffers, allocating the necessary amount of processing resources, configuring one or more receivers/transmitters in a certain way (e.g., scheduling, antenna (re)configuration, RF (re) tuning) in one or more time resources to be able to receive/transmit the signals/channel corresponding to such UE capability, using or controlling the power or energy in a certain way to be able to support such UE capability, (re)distributing or scheduling the beam measurements related tasks in a certain way between different hardware/middleware/software units of the UE to support such UE capability, receiving or transmitting over a certain total bandwidth and carrier frequency combinations associated with the supported beam measurements, etc.

The term beam measurement used herein may comprise any measurement performed based on beam-specific time and/or frequency resources (e.g., SSB-based measurement in the resources associated with a specific beam which may comprise the resources configured for SSBs with one or more different SSB indexes and the same cell identifier) and/or beam-specific signals or channels (e.g., channel state information-reference signal (CSI-RS), Demodulation Reference Signal (DMRS), a beam-specific signal for positioning, etc.), wherein beams can be transmit beam, receive beams, or a combination of transmit and receive beams (e.g., when there is association between transmit and receive beams in the node). A beam measurement can be performed for different purposes: Radio Link Monitoring (RLM), beam management, beam failure detection and recovery, Radio Resource Management (RRM), mobility, positioning, etc. Examples of beam measurements: Synchronization Signal-Reference Signal Received Power (SS-RSRP), Synchronization Signal-Reference Signal Received Quality (SS-RSRQ), Synchronization Signal-Signal to Noise Interference Ratio (SS-SINR), CSI-RS based RSRP, CSI-RS based RSRQ, CSI-RS based SINR, Layer 1 measurements (not filtered at Layer 3) such as Layer 1 RSRP, CSI, SINR (for RLM), Es/Iot, transmit power of a beam, etc. A beam measurement may be further associated with a specific coverage enhancement or coverage level.

The embodiments are applicable to single carrier as well as to multicarrier operation of the UE. Examples of multicarrier operation of the UE are carrier aggregation (CA) and multi-connectivity (MC) where Dual Connectivity (DC) is a special case. In CA the UE is able to receive and/or transmit data to more than one serving cells. Dual Connectivity (DC) is a special case or example of MC. The DC comprises one main cell group (MCG) containing at least primary cell (PCell) and one secondary cell group (SCG) containing at least primary secondary cell (PSCell). The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC). In one example of DC operation involving E-UTRA and NR, the E-UTRA is the master. In another example of the DC operation involving E-UTRA and NR, NR is the master. The DC operation may also involve only NR serving cells (e.g. NR PCell, NR PSCell and NR SCells) or LTE serving cells (e.g. LTE PCell, LTE PSCell and LTE SCells).

The term activation or SCell activation used herein may refer to activation of a serving cell, addition of serving cell, configuration of serving cell etc. The term deactivation or SCell deactivation may refer to deactivation of serving cell, release of serving cell, deconfiguration of serving cell etc. Examples of serving cell that can be configured but deactivated are SCell, PSCell etc. The SCell can also be in an intermediate state between activation and deactivation called herein as dormant state or dormant SCell state, in which case the UE does not receive control or data channel but it can still estimate and report CSI (e.g., channel quality indicator (CQI)) to the network node. In the activation state, the UE can receive and transmit any signal including data and control channels (e.g., physical downlink shared channel (PDSCH), physical downlink control channel (PDCCH), etc.). In the deactivated state, the UE does not receive any control channel or data channels. The UE also does not transmit any CSI measurements to the network node in the deactivated state. The deactivated and dormant states are used for saving UE power. Examples of activation procedure are activation of SCell, addition of PSCell etc. SCell activation may also be called as SCell addition. Examples of deactivation procedure are deactivation of SCell, release of PSCell etc.

According to certain embodiments described herein, the UE may operate using coverage enhancement (CE) with regard to a cell, for example, cell 1 or at different coverage levels. The coverage level can be configured by the network or autonomously by the UE. The CE level of the UE is also interchangeably called as coverage level of the UE. The CE level can be expressed in terms of:
 received signal quality and/or received signal strength at the UE with regard to a cell and/or
 received signal quality and/or received signal strength at a cell with regard to the UE.

The CE level of the UE be defined with respect to any cell such as serving cell, a neighbor cell, a reference cell, etc. For example, it can be expressed in terms of received signal quality and/or received signal strength at the UE with regard to a target cell on which it performs one or more radio measurements. Examples of signal quality are signal-to-noise ratio (SNR), SINR, CQI, narrowband RSRQ (NRSRQ), RSRQ, CRS Es/Iot, SCH Es/Iot, etc. Examples of signal strength are path loss, RSRP, NRSRP, SCH RP etc. The notation Es/Iot is defined as ratio of
 $\hat{E}s$, which is the received energy per RE (power normalized to the subcarrier spacing) during the useful part of the symbol, i.e. excluding the cyclic prefix, at the UE antenna connector, to
 Iot which is the received power spectral density of the total noise and interference for a certain RE (power integrated over the RE and normalized to the subcarrier spacing) as measured at the UE antenna connector The CE level can be expressed in at least two different levels. Consider an example of two different CE levels defined with regard to signal quality (e.g. SNR) at the UE comprising of:
 Coverage enhancement level 1 (CE1) comprising of $SNR \geq -6$ dB at UE with regard to its serving cell; and
 Coverage enhancement level 2 (CE2) comprising of $-15$ dB$\leq$SNR$<-6$ dB at UE with regard to its serving cell.

In the above example, the CE1 may also be interchangeably called as normal coverage level (NCL), baseline coverage level, reference coverage level, basic coverage level, legacy coverage level etc. On the other hand, CE2 may be termed as enhanced coverage level or extended coverage level (ECL).

According to particular embodiments, a parameter defining coverage level of the UE with respect to a cell may also be signalled to the UE by the network node. Examples of such parameters are CE Mode A and CE Mode B signalled to UE category M1, UE category M2 etc. The UE configured with CE Mode A and CE Mode B are also said to operate in normal coverage and enhanced coverage respectively.

It may be noted that even though the embodiments in this document are described for a UE, the same or similar embodiments can also be implemented for any radio node (e.g., UE or radio network node), which can transmit radio signals, receive radio signals or both.

According to certain embodiments, the UE may also be configured with different activity levels, e.g., DRX or non-DRX, or different DRX cycle lengths and/or DRX ON duration periods, measurement cycle lengths (may be used e.g. for measurements on deactivated CCs), etc. The activity level may be configured by the network and/or configured autonomously (for all or at least some of the parameters determining the UE activity-level) by the UE. The UE may operate with discontinuous reception (DRX), whereby it monitors PDCCH periodically according to a configured DRX cycle or cycles, for a configured DRX on duration. When the UE is scheduled, an inactivity timer is started and the UE monitors each PDCCH continuously until such time as the inactivity timer expires. A short and long DRX cycle may be configured. When DRX is in use, the UE is only required to perform measurements according to requirements which are relaxed compared to the non DRX measurements, allowing it to save power by also not measuring during the time when the UE is not required to monitor PDCCH. When dual connectivity is configured, cells in the master cell group (MGC) use a DRX cycle which follows that of the PCell, and cells in the so called secondary cell group (SCG) use a DRX cycle which follows that of the PSCell.

UE beam measurement capability is defined generally above. Herein, we enhance UE beam measurement capability by distinguishing between at least two types of beam measurements for each of the intra-frequency, inter-frequency, and inter-RAT beam measurements. In the embodiments the UE beam measurement capability is adaptive in a sense that the number of beams to be measured by the UE are adapted based on number of carriers and/or type of carriers configured for the beam measurements.

The enhanced UE beam measurement capability may be specified for up to a certain number of carriers such as, for example, up to C1 intra-frequency carriers for the enhanced intra-frequency beam measurement capability, up to C2 intra-frequency carriers for the enhanced inter-frequency beam measurement capability, or up to C3 intra-frequency carriers for the enhanced inter-RAT beam measurement capability, etc. If the number of carriers may be exceeded, then such UE configuration may be avoided to ensure that the UE is operating according to its capability or is not requested for more than it can support. Such a configuration management embodiment can be implemented in the UE and/or in the network, as described below.

According to certain embodiments, the enhanced beam measurements capability may also be for one or more specific UE configurations, for a current UE configuration, for a reference UE configuration, i.e., may comprise one, some or all UE beam measurement capabilities, etc.

Certain embodiments described herein relate to intra-frequency and deactivated CC beam measurements. For example, in a particular embodiment, the UE beam measurement may further comprise X1 beam measurements over all intra-frequency carriers of a first type and X2 beam measurements over all intra-frequency carriers of a second type. In general, there may be n (n>1) types of intra-frequency beam measurements and correspondingly X1, X2, . . . , Xn.

In certain particular embodiments, X1, X2, . . . , Xn may be the same (in one example) or different (in another example) in different RRC states.

In other particular embodiments, X1, X2, . . . , Xn may be the same (in one example) regardless of the UE activity level configuration (e.g., DRX cycle length or measurement periodicity) or different (in another example) depending on the UE activity level configuration (e.g., UE has a higher capability Xi' (Xi<Xi' for at least one i) when the UE is configured with a higher activity level such as non-DRX (versus DRX which is a lower activity level) or shorter DRX (versus longer DRX which is lower activity level)).

In yet other particular embodiments, X1, X2, ..., Xn may be the same (in one example) for any number of intra-frequency carriers such as, for example, for any number of configured CCs or disregard of the maximum number of supported CCs by the UE. In another example, X1, X2, ..., Xn may be depend on the number of intra-frequency carriers configured for intra-frequency measurements, e.g., the number of configured CCs or the maximum number of supported CCs by the UE; for example, there can be X1, X2, ..., Xn when the number of intra-frequency carriers is not smaller than a threshold, and X1', X2', ..., Xn' when the number of intra-frequency carriers is above a threshold, where Xi<Xi' for at least one i.

In another example embodiment, the UE may support X1, X2, ..., Xn when configured with a first CA type (e.g., intra-band CA), and the UE may support X1', X2', ..., Xn' when configured with a second CA type (e.g., inter-band CA).

In yet another example embodiment, the UE may support X1, X2, ..., Xn for NR intra-frequency carriers when configured with no DC, and the UE may support X1', X2', ..., Xn' for NR intra-frequency carriers when configured with any or some specific DC type (e.g., EN-DC). In still another example embodiment, the UE may support X1, X2, ..., Xn for NR intra-frequency carriers when configured with a first DC type (e.g., EN-DC), and the UE may support X1', X2', ..., Xn' for NR intra-frequency carriers when configured with a second DC type (e.g., NR-NR DC).

According to a particular embodiment, if there is also defined per-carrier UE beam measurement capability X, then it may be that: X1+X2+ ... +Xn<X*N or Xi<X*N (for at least one of i=1, 2, ..., n) or Xi<X*N_i (for at least one of i=1, 2, ..., n), where N is the total number of intra-frequency carriers for the UE, and N_i (N_i<=N) is the number intra-frequency carriers associated with the type i of beam measurements (N_i=N when the beam measurements of type i are performed over all N carriers). In this case, for any combination of the parameters X, Xi, N, and N_i, the UE shall be capable of support each of the capabilities X and Xi (i=1, 2, ..., n, for any i which is applicable for a given UE configuration; e.g. if X2 is for the deactivated CCs and UE is not configured with deactivated CCs then i=2 is not applicable), but also a combined function of X and Xi for the applicable values of i, e.g., one or more of:

min(X*N_i, Xi)
min(X*N, Xi)
min(X*N_i, sum(Xi) over the applicable values of i)
min(X*N, sum(Xi) over the applicable values of i)

Some examples of different intra-frequency beam measurement types are provided. Any one or a combination may apply. For example, an example combination is when two different types are subtypes Xi_a and Xi_b of the type i and the UE shall meet all subtype-level capabilities and a combined function of the subtype-level and type-level capabilities e.g. min(Xi,Xi_a,Xi_b) or min(Xi,(Xi_a+Xi_b))):

The first type corresponds to the total number of beam measurements over all configured and activated component carriers (CCs) and the second type corresponds to the total number of beam measurements over all configured and deactivated carrier components.

The first type corresponds to the number of beam measurements over all intra-frequency carriers of a first type (e.g., comprised in a first subrange of the frequency range FR2) and the second type corresponds to the number of beam measurements over all intra-frequency carriers of a second type (e.g., comprised in a second subrange of the frequency range FR2). FR1 comprises frequencies smaller than those comprised in FR2. An example of FR1 is any frequency in frequency bands up to 6 GHz (e.g., subrange below 3 GHz and subrange above 3 GHz but below 6 GHz) and example of FR2 is any frequency in frequency bands above 6 GHz and up to 52.6 GHz.

Depending on coverage level, for example, the first type corresponds to the total number of beam measurements over all configured CCs in normal coverage and the second type corresponds to the total number of beam measurements over all configured CCs in enhanced coverage. Alternatively, the first type corresponds to the total number of beam measurements in normal coverage and the second type corresponds to the total number of beam measurements in enhanced coverage.

The first type corresponds to the number of beam measurements per carrier (e.g., X1_a for carrier frequency 'a', X1_b for carrier frequency 'b', etc. where 'a', 'b', etc. are the currently configured carrier, and X1_a may be the same or different from X1_b) and the second type corresponds to the total number of beam measurements X2 over all configured CCs for up to Q number of CCs, so that the UE shall be capable of the combined capability min(X2, (X1_a+X1_b+ ... )) wherein the combined capability becomes dependent on the UE configuration which is defined for up to Q number of CCs (which therefore needs to be controlled by the network node and or UE to not be exceeded).

The first type corresponds to the total number of beam measurements for up to Q number of carrier frequencies, and the second type corresponds to a combined beam measurement capability (e.g., the minimum of the first type and the linear scaling of the per-carrier capability with the currently configured number of carriers Q' wherein Q'≤Q).

The first type corresponds to the number of beam measurements over all intra-frequency carriers belonging to FR1, the second type corresponds to the number of beam measurements over all intra-frequency carriers belonging to FR2, and the third type corresponds to the number of beam measurements over all intra-frequency carriers belonging to a third frequency range (FR3). An example of FR3 is any frequency in frequency bands above 52.6 GHz.

Depending on the current UE measurement gap configuration, the first type corresponds to the number of beam measurements with gaps and the second type corresponds to the number of beam measurements without gaps; or the first type corresponds to the number of beam measurements performed in a first type of gaps (e.g., measurement gap pattern with MGRP below a threshold and/or a first MGL configuration and/or configured by PCell) and the second type corresponds to the number of beam measurements performed in a second type of gaps (e.g., measurement gap pattern with MGRP above a threshold and/or a second MGL configuration and/or configured by PSCell).

The first type corresponds to the number of beam measurements within the bandwidth BW1<=threshold and the second type corresponds to the number of beam measurements within the bandwidth BW2>threshold.

Depending on measurement cycle, DRX or activity level in general, the first type corresponds to the number of beam measurements performed on carriers operating in non DRX, and the second type corresponds to the number of beam measurements operating on carriers in DRX. In another example, the first type corresponds to the number of beam measurements performed on carriers operating with DRX cycle below a threshold, and the second type corresponds to the number of beam measurements operating on carriers with DRX cycle above a threshold. In yet another example, the first type corresponds to the number of beam measurements performed on carriers operating with a measurement cycle below a threshold, and the second type corresponds to the number of beam measurements operating on carriers with measurement cycle above a threshold. In yet another example, the first type corresponds to the number of beam measurements performed on carriers operating with an activity level below a threshold (e.g., with a lower activity such a less frequent measurements), and the second type corresponds to the number of beam measurements operating on carriers with an activity level above a threshold (e.g., with a higher activity such as more frequent measurements).

The first type corresponds to the number of beam measurements on PCC (CC of the PCell), the second type corresponds to the number of beam measurements on PSCC (CC of the PSCell) if PSCell is configured, and the third type corresponds to the number of beam measurements on all SCCs (CCs with an SCell).

In another example in EN-DC operation, the first type corresponds to the number of beam measurements on PSCC (CC of the PSCell) and the second type corresponds to the number of beam measurements on all SCCs (CCs with an SCell).

In yet another example in EN-DC operation, the first type corresponds to the number of beam measurements on PSCC (CC of the PSCell), the second type corresponds to the number of beam measurements on all activated SCCs (CCs with activated SCells), and the third type corresponds to the number of beam measurements on all deactivated SCCs (CCs with deactivated SCells).

In yet another example in EN-DC operation, the first type corresponds to the number of beam measurements on PSCC (CC of the PSCell), the second type corresponds to the number of beam measurements on all activated SCCs (CCs with activated SCells), the third type corresponds to the number of beam measurements on all deactivated SCCs (CCs with deactivated SCells), and the fourth type corresponds to the number of beam measurements on all SCCs with dormant SCells.

The first type corresponds to the number of beam measurements on PCC (CC of the PCell), the second type corresponds to the number of beam measurements on PSCC (CC of the PSCell) if PSCell is configured, the third type corresponds to the number of beam measurements on all configured and activated SCCs, and the fourth type corresponds to the number of beam measurements on all configured and deactivated SCCs.

Depending on the multi-connectivity (including dual connectivity as a special case) configuration: the first type corresponds to the beam measurements when the UE is configured with a first multi-connectivity configuration, and the second type corresponds to the beam measurements when the UE is configured with a second multi-connectivity connectivity configuration wherein the first and the second multi-connectivity configurations may differ e.g. in one or more of: number of secondary serving cells (e.g., the number of serving cells that are not PCell and not SCells) and the RAT of the serving cells (e.g., LTE PCell and NR PSCell in the first configuration and NR PCell and NR PSCell in the second configuration or NR PCell and LTE PSCell in the second configuration).

In yet another example, the first type corresponds to the number of beam measurements on PCC (CC of the PCell), the second type corresponds to the number of beam measurements on PSCC (CC of the PSCell) if PSCell is configured, the third type corresponds to the number of beam measurements on all configured and activated SCCs, the fourth type corresponds to the number of beam measurements on all configured and deactivated SCCs, and the fifth type corresponds to the number of beam measurements on all configured and SCCs with dormant SCells.

The first type corresponds to the number of beam measurements based on a first type of signals (e.g., SSB) and the second type corresponds to the number of beam measurements based on a second type of signals (e.g., CSI-RS).

For UE in RRC_CONNECTED, X1 is the total number of beam measurements over all configured and activated carrier components (CCs) and X2 is the total number of beam measurements over all configured and deactivated carrier components. For example, X1=48 and X2=24. The parameters X1 and X2 can be pre-defined or they can be configured at the UE by the network node.

In yet another example for UE in RRC_CONNECTED, X11 is the total number of beam measurements over all configured and activated carrier components (CCs), X12 is the total number of beam measurements over all configured and deactivated carrier components with SCell measurement cycle equal to or below threshold (e.g. 640 ms), and X13 is the total number of beam measurements over all configured and deactivated carrier components with SCell measurement cycle above the threshold. For example X11=48 and X12=14 and X13=10. The parameters X11, X12 and X13 can be pre-defined or they can be configured at the UE by the network node.

In yet another example for UE in RRC_CONNECTED, Y1 is the total number of beam measurements over all configured and activated carrier components (CCs), Y2 is the total number of beam measurements over all configured and deactivated carrier components, and Y3 is the total number of beam measurements over all configured and dormant carrier components (carriers with dormant SCell). For example, Y1=48, Y2=8 and Y3=16. The parameters Y1, Y2 and Y3 can be pre-defined or they can be configured at the UE by the network node.

In another example for UE in RRC_CONNECTED, X1 is the total number of beam measurements over all configured and activated carrier components (CCs) and X2 is the total number of beam measurements over all configured and deactivated carrier components, and at least for one value of i (i=1, 2) Xi_a is the number of beam measurements based on a first type of signals (e.g., SSB), and Xi_b is the number of beam measurements based on a second type of signals (e.g., CSI-RS), so that the UE shall support Xi_a, Xi_b, and min(Xi, Xi_a,Xi_b).

Xi_b can be either Xi_b1 provided the second type of signals has bandwidth not larger than a threshold or Xi_b2 (Xi_b2<Xi_b1) when the second type of signals has bandwidth above the threshold Depending on UE receiver (RX) beamforming, the first type corresponds to the number of beam measurements requiring beam sweeping and the second type corresponds to the number of beam measurements without beam sweeping.

In yet another example for UE in RRC_CONNECTED, Y1 is the total number of beam measurements over all configured and activated carrier components (CCs), Y2 is the total number of beam measurements over all configured and deactivated carrier components, and Y3 is the total number of beam measurements over all configured and dormant carrier components (carriers with dormant SCell) and at least for one value of j (j=1, 2, 3) Yj_a is the number of beam measurements based on a first type of signals (e.g., SSB), and Yj_b is the number of beam measurements based on a second type of signals (e.g., CSI-RS), so that the UE shall support Yj_a, Yj_b, and min(Yj,Yj_a,Yj_b).

Certain embodiments may relate to inter-frequency measurements, and the embodiments described above for intra-frequency beam measurements and beam measurements on deactivated carriers may be adapted for inter-frequency beam measurements.

According to certain embodiments, the UE beam measurement capability may further comprise Y1 beam measurements over all inter-frequency carriers of a first type and Y2 beam measurements over all inter-frequency carriers of a second type. In general, there may be m (m>1) types of inter-frequency beam measurements and correspondingly Y1, Y2, . . . , Ym.

According to particular embodiments, Y1, Y2, Ym may be the same (in one example) or different (in another example) in different RRC states.

According to other particular embodiments, Y1, Y2, . . . Ym may be the same (in one example) disregard of the UE activity level configuration (e.g., DRX cycle length or measurement periodicity) or different (in another example) depending on the UE activity level configuration (e.g., UE has a higher capability Yi' (Yi<Yi' for at least one i) when the UE is configured with a higher activity level such as non-DRX (versus DRX which is a lower activity level) or shorter DRX (versus longer DRX which is lower activity level)).

According to other particular embodiments, Y1, Y2, . . . , Ym may be the same (in one example) disregard of the UE CA configuration or UE CA capability or different (in another example) depending on the UE CA configuration or UE CA capability (e.g., a higher capability for UE with a higher CA capability; or a smaller inter-frequency capabilities Y1, . . . Ym when the UE is configured with CA compared to non-CA case since some of the UE resources are need for CA and thus less available resources for inter-frequency).

According to certain embodiments, if there is also defined per-carrier UE beam measurement capability Y, then it may so that: Y1+Y2+ . . . +Ym<Y*N or Yi<X*N (for at least one of i=1, 2, . . . , m) or Yi<Y*N_i (for at least one of i=1, 2, . . . , m), where N is the total number of inter-frequency carriers for the UE, and N_i (N_i<=N) is the number inter-frequency carriers associated with the type i of beam measurements (N_i=N when the beam measurements of type i are performed over all N carriers). In this case, for any combination of the parameters Y, Yi, N, and N_i, the UE shall be capable to support each of the capabilities Y and Yi (i=1, 2, . . . , m, for any i which is applicable for a given UE configuration), but also a combined function of Y and Yi for the applicable values of i, e.g., one or more of:

min(Y*N_i, Yi)
min(Y*N, Yi)
min(Y*N_i, sum(Yi) over the applicable values of i)
min(Y*N, sum(Yi) over the applicable values of i)

Examples of different inter-frequency beam measurement types are provided. Any one or a combination may apply. For example, an example combination is when two different types are subtypes Xi_a and Xi_b of the type i and the UE shall meet all subtype-level capabilities and a combined function of the subtype-level and type-level capabilities such as min(Xi,Xi_a,Xi_b)):

The first type corresponds to the number of beam measurements based on a first type of signals (e.g., SSB) and the second type corresponds to the number of beam measurements based on a second type of signals (e.g., CSI-RS).

Depending on UE rx beamforming: The first type corresponds to the number of beam measurements requiring sweeping and the second type corresponds to the number of beam measurements without sweeping The first type corresponds to the number of beam measurements within the bandwidth BW1<=threshold and the second type corresponds to the number of beam measurements within the bandwidth BW2>threshold.

Depending on the current UE measurement gap configuration, the first type corresponds to the number of beam measurements with gaps and the second type corresponds to the number of beam measurements without gaps; or the first type corresponds to the number of beam measurements performed in a first type of gaps (e.g., measurement gap pattern with MGRP below a threshold and/or a first MGL configuration and/or configured by PCell) and the second type corresponds to the number of beam measurements performed in a second type of gaps (e.g., measurement gap pattern with MGRP above a threshold and/or a second MGL configuration and/or configured by PSCell).

The first type corresponds to interfrequency carriers configured by the PCell and the second type corresponds to interfrequency carriers configured by the PSCell.

Depending on DRX or activity level in general, the first type corresponds to the number of beam measurements performed on carriers operating in non DRX, and the second type corresponds to the number of beam measurements operating on carriers in DRX. In another example, the first type corresponds to the number of beam measurements performed on carriers operating with DRX cycle below a threshold, and the second type corresponds to the number of beam measurements operating on carriers with DRX cycle above a threshold. In yet another example, the first type corresponds to the number of beam measurements performed on carriers operating with an activity level below a threshold (e.g., with a lower activity such a less frequent measurements), and the second type corresponds to the number of beam measurements operating on carriers with an activity level above a threshold (e.g., with a higher activity such as more frequent measurements).

Depending on coverage level, for example, the first type corresponds to the total number of beam measurements over all configured CCs in normal coverage and the second type corresponds to the total number of beam measurements over all configured CCs in enhanced coverage. Alternatively, the first type corresponds to the total number of beam measurements in normal coverage and the second type corresponds to the total number of beam measurements in enhanced coverage The embodiments for intra-frequency beam measurements and beam measurements on deactivated carriers, as described above, may also be adapted for inter-RAT beam measurements.

In a particular embodiment, the UE beam measurement may further comprise Z1 beam measurements over all inter-RAT carriers of a first type and Z2 beam measurements over all inter-RAT carriers of a second type. In general, there may be k (k>1) types of inter-RAT beam measurements and correspondingly Z1, Z2, . . . , Zk. Z1, Z2, . . . , Zk may be defined for a single RAT.

In particular embodiments, Z1, Z2, . . . , Zk may be the same (in one example) or different (in another example) in different RRC states.

In other particular embodiments, Z1, Z2, . . . Zk may be the same (in one example) disregard of the UE activity level configuration (e.g., DRX cycle length or measurement periodicity) or different (in another example) depending on the UE activity level configuration (e.g., UE has a higher capability Zi' (Zi<Zi' for at least one i) when the UE is configured with a higher activity level such as non-DRX (versus DRX which is a lower activity level) or shorter DRX (versus longer DRX which is lower activity level)).

In still other particular embodiments, Z1, Z2, . . . , Zk may be the same (in one example) disregard of the UE CA configuration or UE CA capability or different (in another example) depending on the UE CA configuration or UE CA capability (e.g., a higher capability for UE with a higher CA capability; or a smaller inter-RAT capabilities Z1, . . . Zk when the UE is configured with CA compared to non-CA case since some of the UE resources are need for CA and thus less available resources for inter-RAT).

According to a particular embodiment, if there is also defined per-carrier UE beam measurement capability Z, then it may so that: Z1+Z2+ . . . +Zk<Z*N or Zi<Z*N (for at least one of i=1, 2, . . . , k) or Zi<Z*N_i (for at least one of i=1, 2, . . . , k), where N is the total number of inter-RAT carriers for the UE, and N_i (N_i<=N) is the number inter-RAT carriers associated with the type i of beam measurements (N_i=N when the beam measurements of type i are performed over all N carriers). In this case, for any combination of the parameters Z, Zi, N, and N_i, the UE shall be capable to support each of the capabilities Z and Zi (i=1, 2, . . . , k, for any i which is applicable for a given UE configuration), but also a combined function of Z and Zi for the applicable values of i, e.g., one or more of:

min(Z*N Zi)
min(Z*N, Zi)
min(Z*N_i, sum(Zi) over the applicable values of i)
min(Z*N, sum(Zi) over the applicable values of i)

Examples of different inter-RAT beam measurement types are provided. It may be recognized that any one or combination may apply. For example, an example combination is when two different types are subtypes Xi_a and Xi_b of the type i and the UE shall meet all subtype-level capabilities and a combined function of the subtype-level and type-level capabilities such as min(Xi,Xi_a,Xi_b)):

The first type corresponds to the number of beam measurements based on a first type of signals (e.g., SSB) and the second type corresponds to the number of beam measurements based on a second type of signals (e.g., CSI-RS).

Depending on UE rx beamforming, the first type corresponds to the number of beam measurements requiring sweeping and the second type corresponds to the number of beam measurements without sweeping.

Depending on the current UE measurement gap configuration, the first type corresponds to the number of beam measurements with gaps and the second type corresponds to the number of beam measurements without gaps; or the first type corresponds to the number of beam measurements performed in a first type of gaps (e.g., measurement gap pattern with MGRP below a threshold and/or a first MGL configuration and/or configured by PCell) and the second type corresponds to the number of beam measurements performed in a second type of gaps (e.g., measurement gap pattern with MGRP above a threshold and/or a second MGL configuration and/or configured by PSCell).

The first type corresponds to the number of beam measurements within the bandwidth BW1<=threshold and the second type corresponds to the number of beam measurements within the bandwidth BW2>threshold.

The first type corresponds to interfrequency carriers configured by the PCell and the second type corresponds to interfrequency carriers configured by the PSCell.

Depending on coverage level, for example, the first type corresponds to the total number of beam measurements over all configured CCs in normal coverage and the second type corresponds to the total number of beam measurements over all configured CCs in enhanced coverage; or the first type corresponds to the total number of beam measurements in normal coverage and the second type corresponds to the total number of beam measurements in enhanced coverage The embodiments above describing enhanced beam measurement capability also implicitly describe UE embodiments on controlling these capabilities and methods to determine the applicable enhanced beam measurement capability depending on the UE configuration. According to certain embodiments, the UE configuration may be received from a network node. According to certain other embodiments, the UE configuration may be autonomously configured by the UE. For example, in a particular embodiment, the UE may operate to determine the UE configuration for which the beam measurement capability is different and control the UE configuration to meet the desired beam measurement capability. In another particular embodiment, the UE may be operable to determine its CA configuration/coverage level/activity level/gaps and determine its corresponding UE beam measurements capability in order to control a further measurement configuration, which should not exceed the UE beam measurements capability, in a particular embodiment.

According to certain embodiments, the method may comprise the following steps:

UE determines its enhanced beam measurement capability. See above for UE operations for determining enhanced beam measurement capability for at least one of: intra-frequency, inter-frequency, and inter-RAT.

In some embodiments, the UE may indicate the determined beam measurement capability to another node. For example, in a particular embodiment, the UE may indicate the determined beam measurement capability to a network node such as, for example, a gNB or positioning node upon a request from the node or in an unsolicited way such as, for example upon a triggering event in the UE. The determined beam measurements capability may also be for one or more specific UE configurations, for a current UE configuration, for a reference UE configuration, for a preferred UE configuration, i.e., may comprise one, some, or all UE beam measurement capabilities, etc.

UE performs in parallel (e.g., over a certain time period or during one or more time resources) an amount of beam measurements which is within its determined beam measurement capability, wherein the performing may further comprise one or more of:
  receiving the signals on which the measurements are to be performed,
  allocating the necessary amount of memory or buffers,
  allocating the necessary amount of processing resources,
  configuring one or more receivers/transmitters in a certain way (e.g., scheduling, antenna (re)configuration, RF (re)tuning) in one or more time resources to be able to receive/transmit the signals/channels while not exceeding the determined capability,
  using or controlling the power or energy in a certain way to be able to support the determined capability,
  (re)distributing or scheduling the beam measurements related tasks in a certain way between different hardware/middleware/software units of the UE to support the determined capability,
  receiving or transmitting over a certain total bandwidth and carrier frequency combinations associated with the supported beam measurements, and
  meeting one or more performance-related requirements corresponding to the determined capability, e.g., performing and reporting all the beam measurements with a quality or accuracy, which is not lower than what is required, within the time not longer than a pre-defined measurement time period, in some embodiments, reporting a result of the performed beam measurements to higher layers and/or to another node, etc.

in some embodiments, the UE may use a result of the performed beam measurements for its one or more operational tasks (e.g., RRM, mobility, handover, beam management, RLM, positioning, MDT, etc.)
  the UE may also be required to meet one or more predefined requirements for such UE operational task According to certain embodiments, when the UE is configured or determines a need for performing one or more additional measurements that are above the determined capability, the UE may:
  indicate an error or send a message to another node (e.g., radio network node, core network node, or positioning node) that the determined capability has been exceeded
  save or log in the UE an indication that the determined capability has been exceeded (this indication may be further associated with measurement type, measurement ID and/or time, etc.)
  extend the measurement period, delay or postpone the beginning the additional measurement until some other measurement is complete and the determined capability is not exceeded any more
  drop the additional measurement (e.g., do not start and/or do not report its result)
  do not start measurements on a new intra-frequency carrier unless (or until) the combined measurement capability is not exceeded for the already used intra-frequency carriers for the intra-frequency beam measurements
  do not configure and/or activate more CCs if the UE does not support the enhanced beam measurements capability with new set of configured and/or activated CCs (e.g., the number of configured and/or activated CCs is above the number of configured and/or activated CCs in the determined capability)

The UE embodiments described above may also implicitly describe the network embodiments. Also the embodiments describing enhanced beam measurement capability discussed above may implicitly describe network embodiments on controlling which beam measurements capabilities to apply. In a particular embodiment, for example, the network node may determine the UE configuration for which the beam measurement capability is different and control the UE configuration to meet the desired beam measurement capability. In a particular embodiment, the UE configuration may be received from the network node. In another particular embodiment, the UE configuration may be autonomously selected by the UE and indicated to the network node.

According to certain embodiments, the network node may configure the UE with some CA configuration/coverage level/activity level/gaps and determine the corresponding UE capability in order to control a further UE measurement configuration which should not exceed the UE beam measurement capability).

According to certain embodiments, the network node may perform one or more of:
  determining the UE's enhanced beam management capability (see section 5.2), e.g., based on an indication or message received from the UE or another network node aware of the UE's capability (e.g., in a handover-related message or from the node serving the UE),
  configuring one or more beam measurements so that the determined capability is not exceeded in the UE,
  selectively configuring the number of carriers in the UE, e.g., CA combination, number of CCs, number of activated CCs, number of deactivated CCs, number of measurement objects associated with a different carrier, DRX operation etc., based on the determined capability (e.g., avoid configuring more than a threshold number of carriers if the UE beam measurements capability becomes exceeded or the amount of beam measurements per carrier in average reduces and may become insufficient e.g. for a desired service),
  adapting the number of carriers in the UE to the determined capability, e.g., if an additional carrier would exceed the determined capability, the network node would deconfigure or deactivate another carrier prior to configuring a new one; e.g.:
    The UE has beam measurement capability wherein the first type corresponds to the number of beam measurements per carrier (e.g., $X1\_a$ for carrier frequency 'a', $X1\_b$ for carrier frequency 'b', etc. where $X1\_a$ may be the same or different from $X1\_b$) and the second type corresponds to the total number of beam measurements $X2$ over all configured CCs for up to Q number of CCs, so that the UE shall be capable of the combined capability $\min(X2, (X1\_a+X1\_b+\ldots))$ wherein the combined capability becomes dependent on the UE configuration which is defined for up to Q number of CCs (which therefore needs to be controlled by the network node and or UE to not be exceeded)
  controlling the UE activity level, based on the determined capability (e.g., if the UE is expected to perform an amount of beam measurements above a threshold, then the network node would configure the UE activity level that allows for the desired beam measurements capability), and controlling the UE's coverage level, based on the determined capability (e.g., if the UE is expected to perform an amount of beam measurements above a threshold, then the network node would control the UE coverage level that allows for the desired beam measurements capability; the controlling may comprise selecting the serving cell and configuring the coverage level via RRC).

Figure 4:
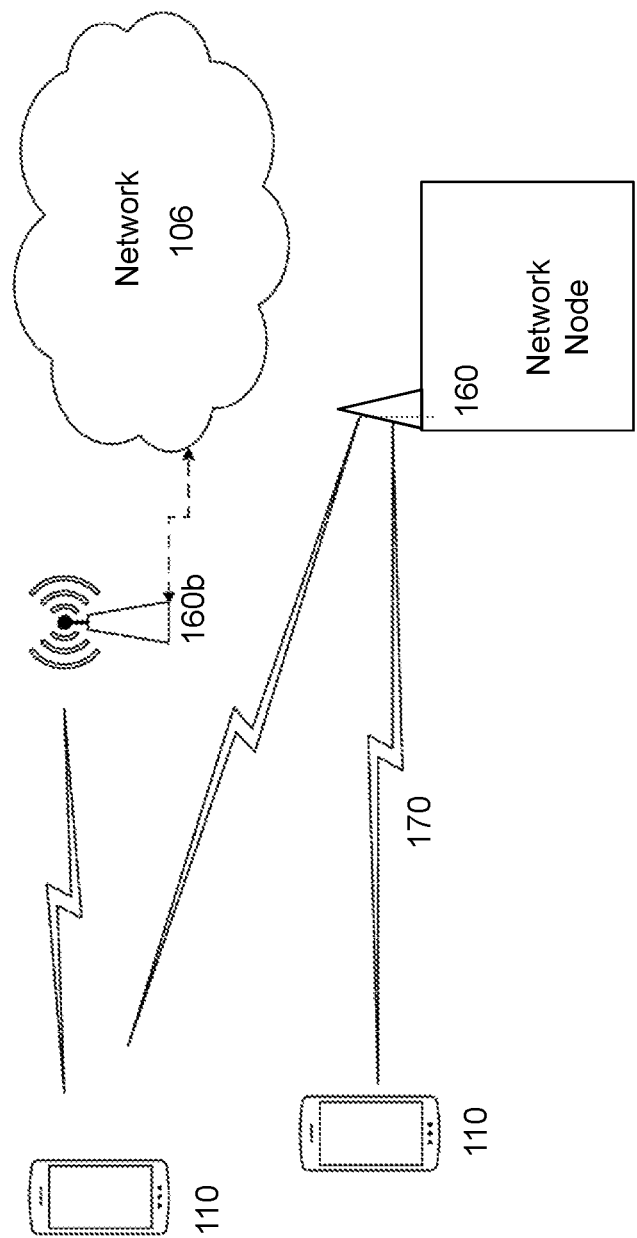
FIG. 4 illustrates an example wireless network for controlling adaptive beam measurement capability, according to certain embodiments.

FIG. 4 illustrates an example wireless network for controlling adaptive beam measurement capability, in accordance with some embodiments. Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

Figure 5:
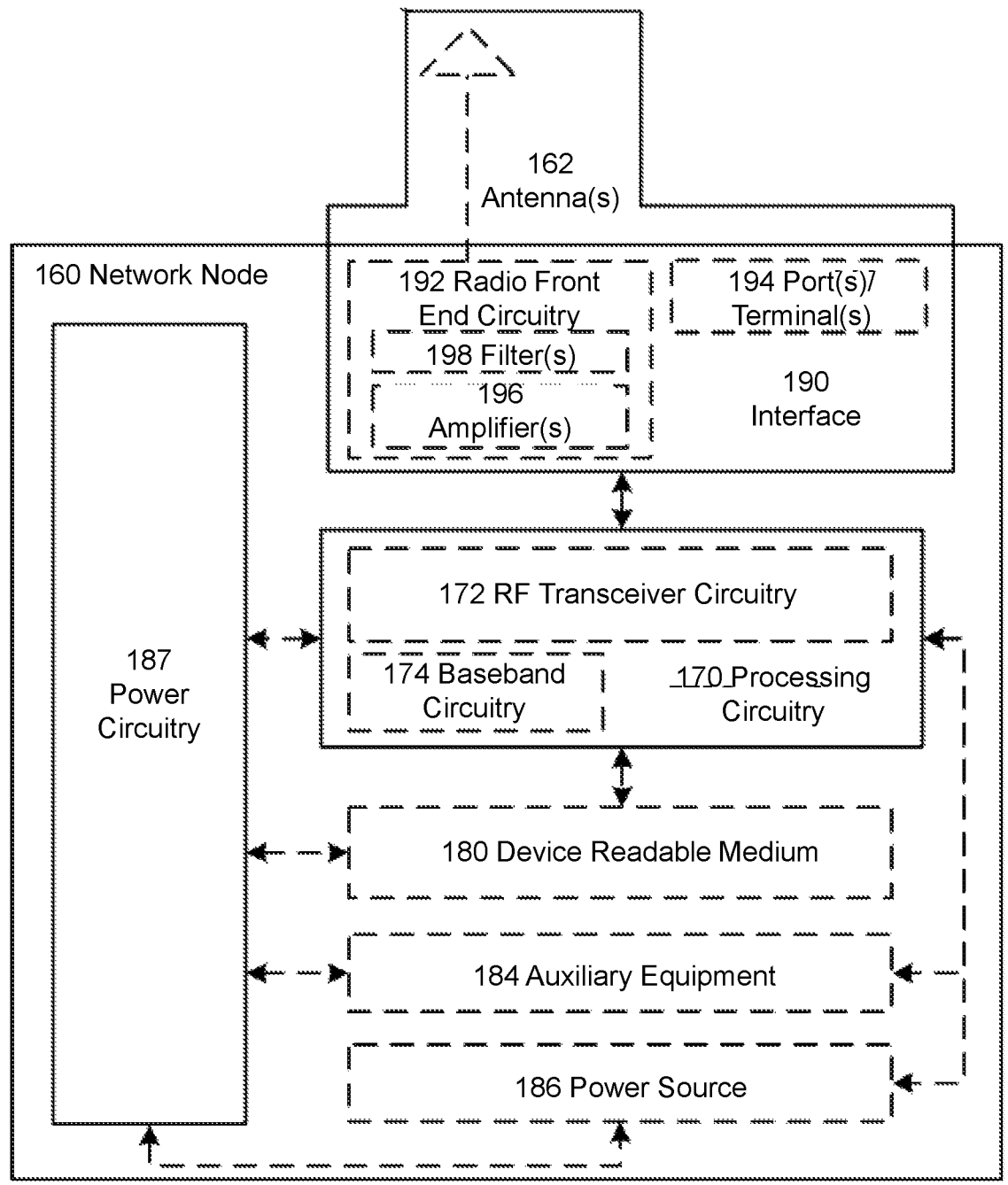
FIG. 5 illustrates an example network node for controlling adaptive beam measurement capability, according to certain embodiments.

FIG. 5 illustrates an example network node 160 for controlling adaptive beam measurement capability, according to certain embodiments. In the depicted example embodiment, network node 160 includes processing circuitry 170, device readable medium 180, interface 190, auxiliary equipment 184, power source 186, power circuitry 187, and antenna 162. Although network node 160 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 5 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 6:
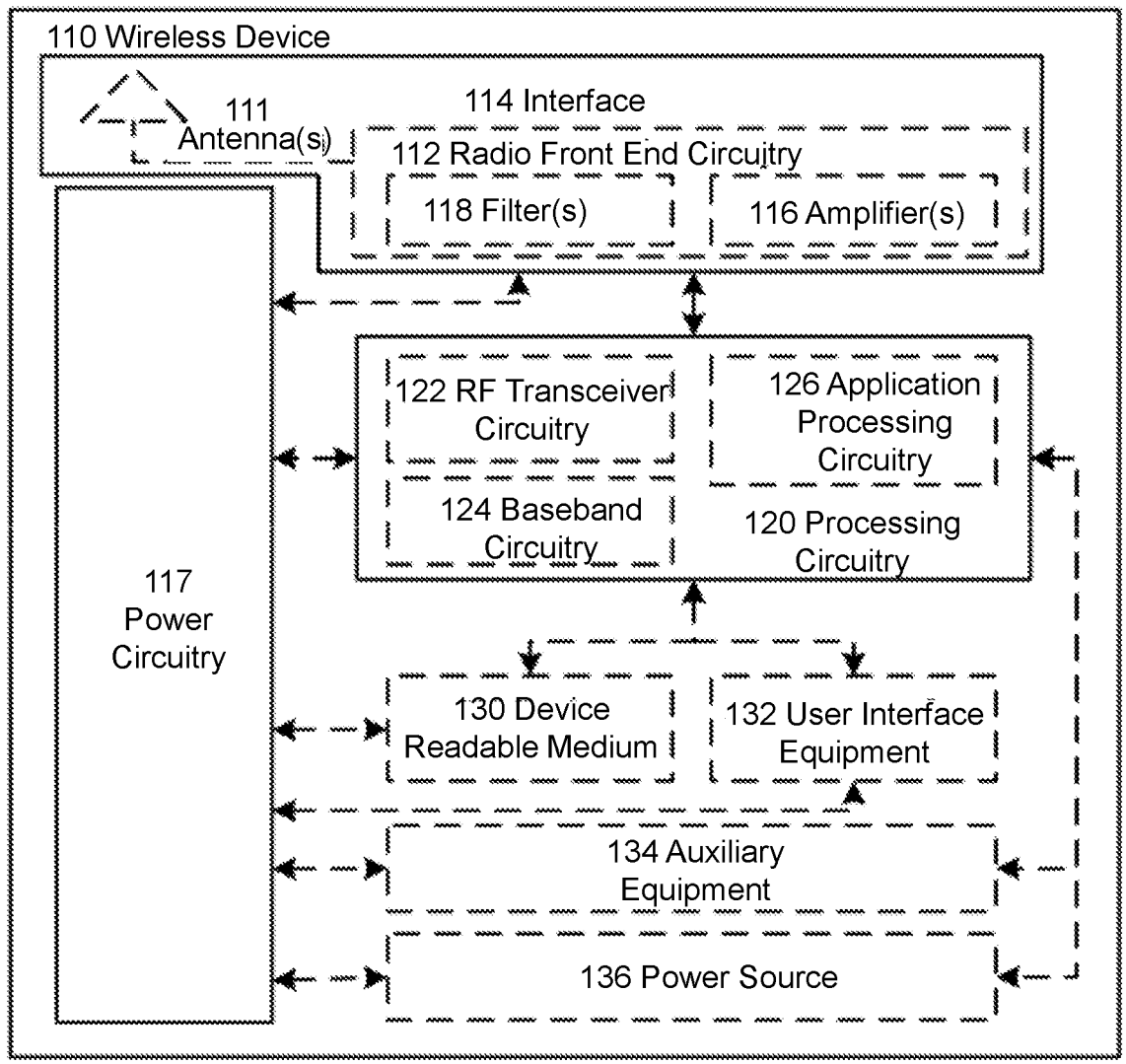
FIG. 6 illustrates an example wireless device for controlling adaptive beam measurement capability, according to certain embodiments.

FIG. 6 illustrates an example wireless device (WD) for controlling adaptive beam measurement capability, according to certain embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated in FIG. 6, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated in FIG. 6, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 7:
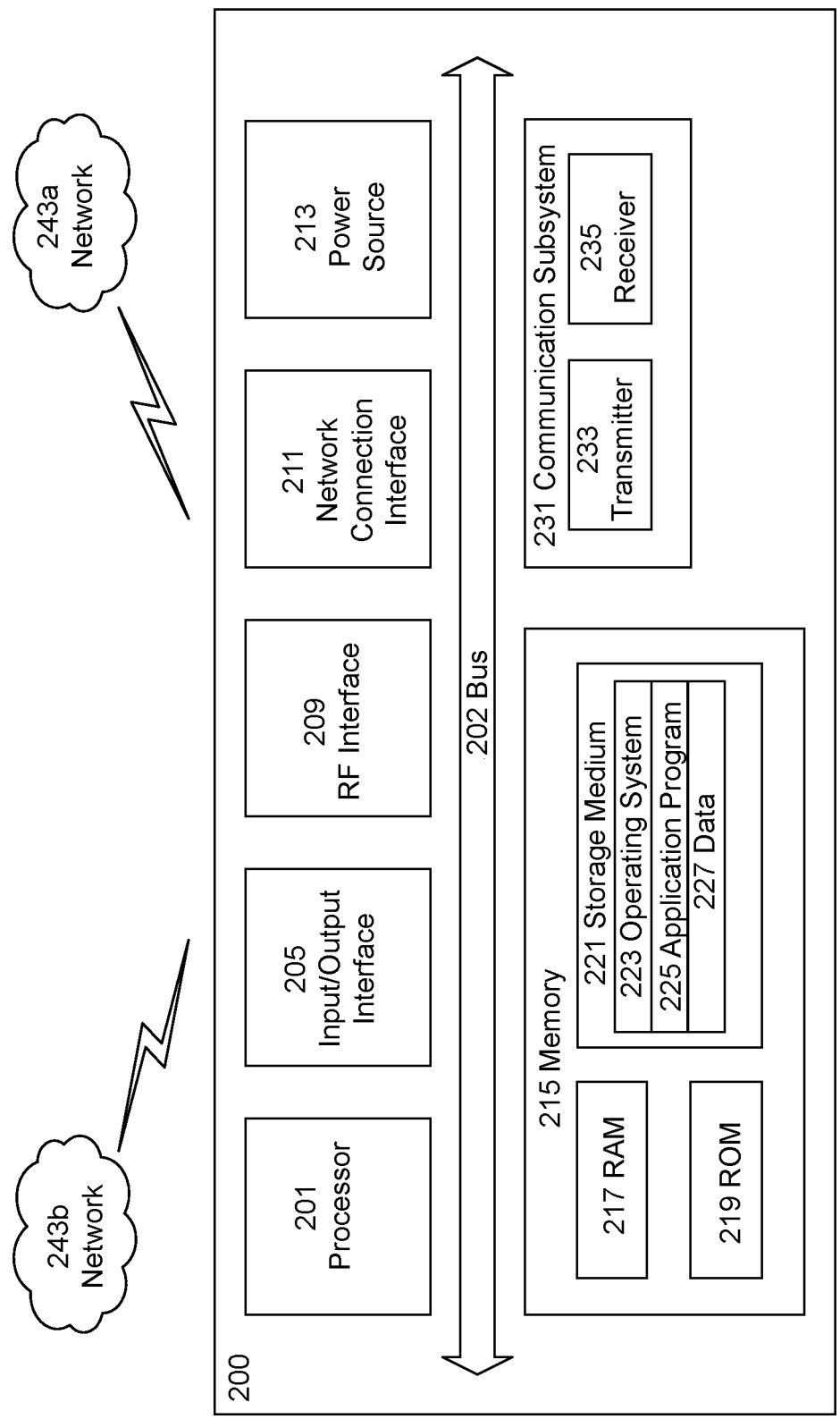
FIG. 7 illustrate an example user equipment for controlling adaptive beam measurement capability, according to certain embodiments.

FIG. 7 illustrates one embodiment of a UE for controlling adaptive beam measurement capability in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 5, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 7, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 8:
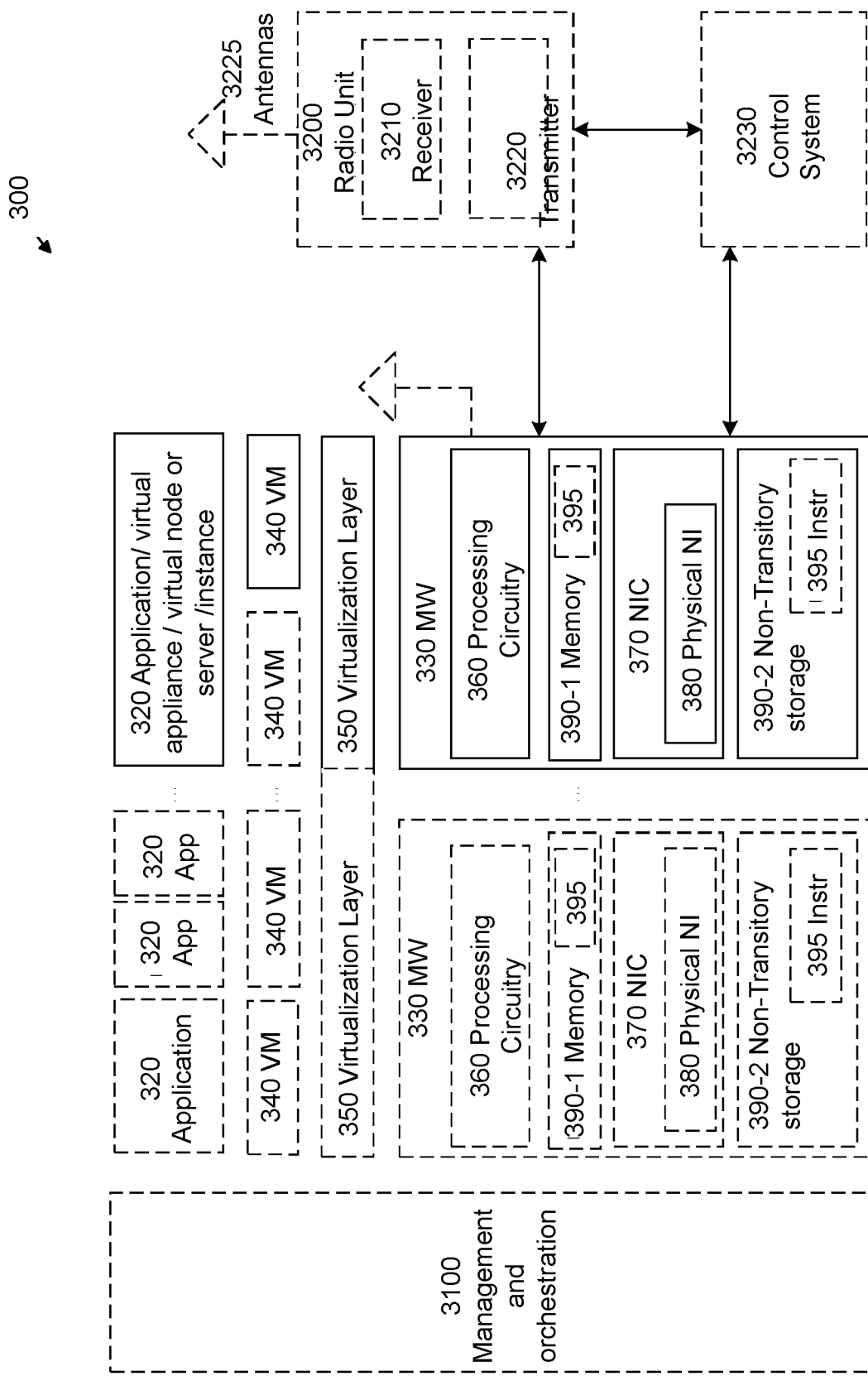
FIG. 8 illustrates a schematic block diagram illustrating a virtualization environment in which functions implemented by some embodiments may be virtualized, according to certain embodiments.

FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

Figure 16:
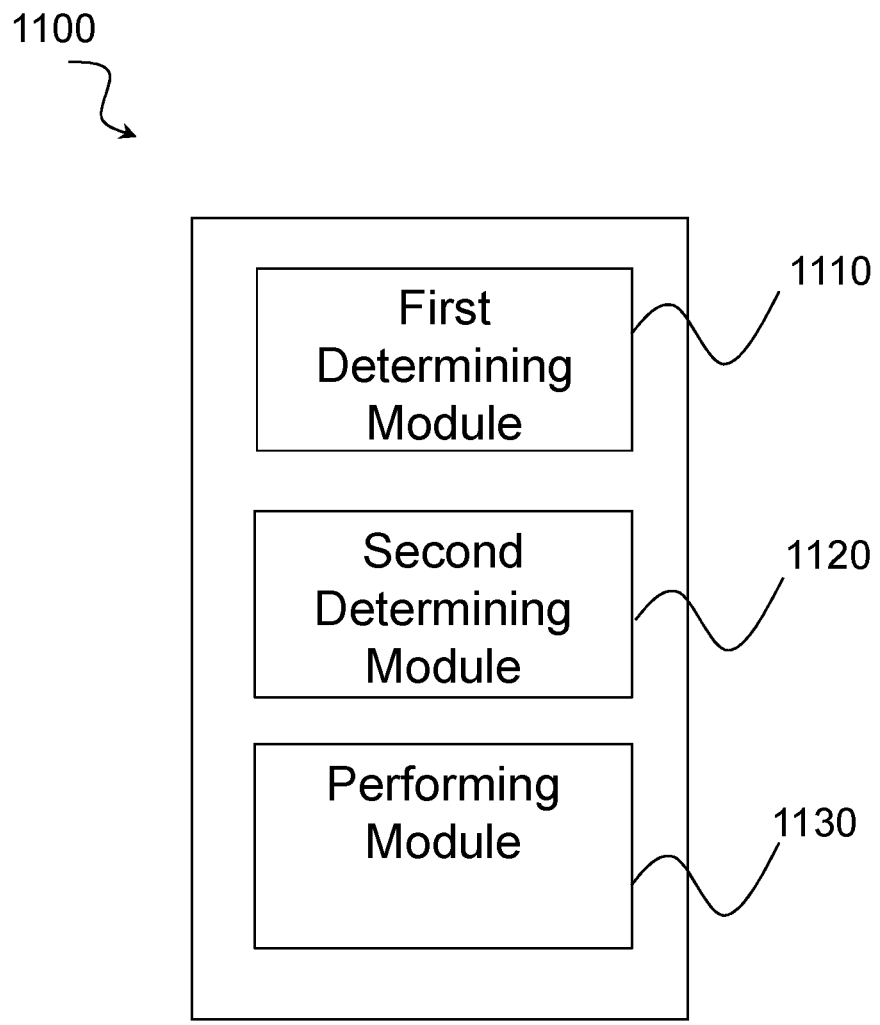
FIG. 16 illustrates an exemplary virtual computing device for controlling adaptive beam measurement capability, according to certain embodiments.

As shown in FIG. 16, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 8.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 9:
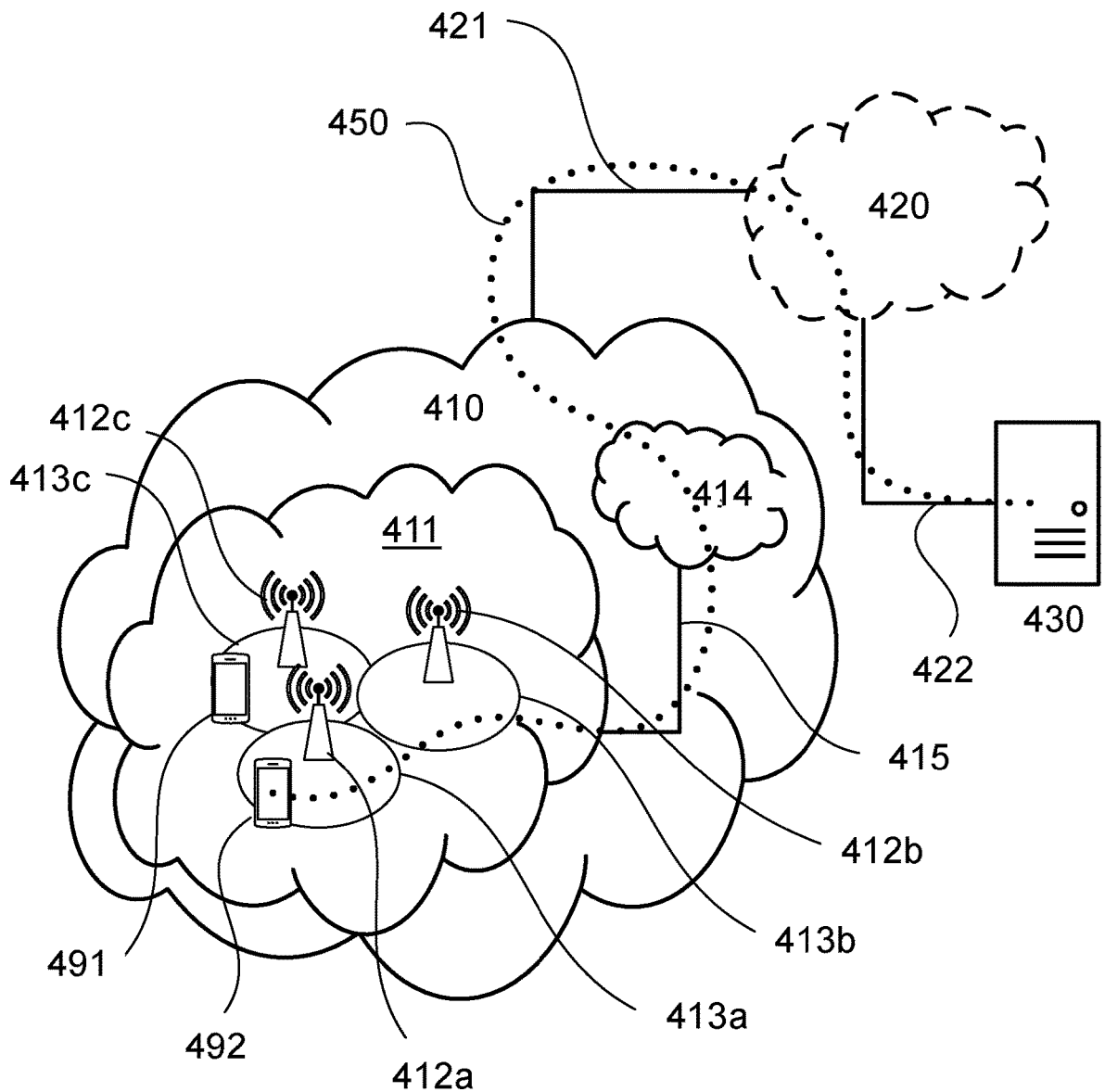
FIG. 9 illustrates a telecommunication network connected via an intermediate network to a host computer, according to certain embodiments.

FIG. 9 illustrates a telecommunication network connected via an intermediate network to a host computer in accordance with some embodiments. In accordance with the depicted example embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 10:
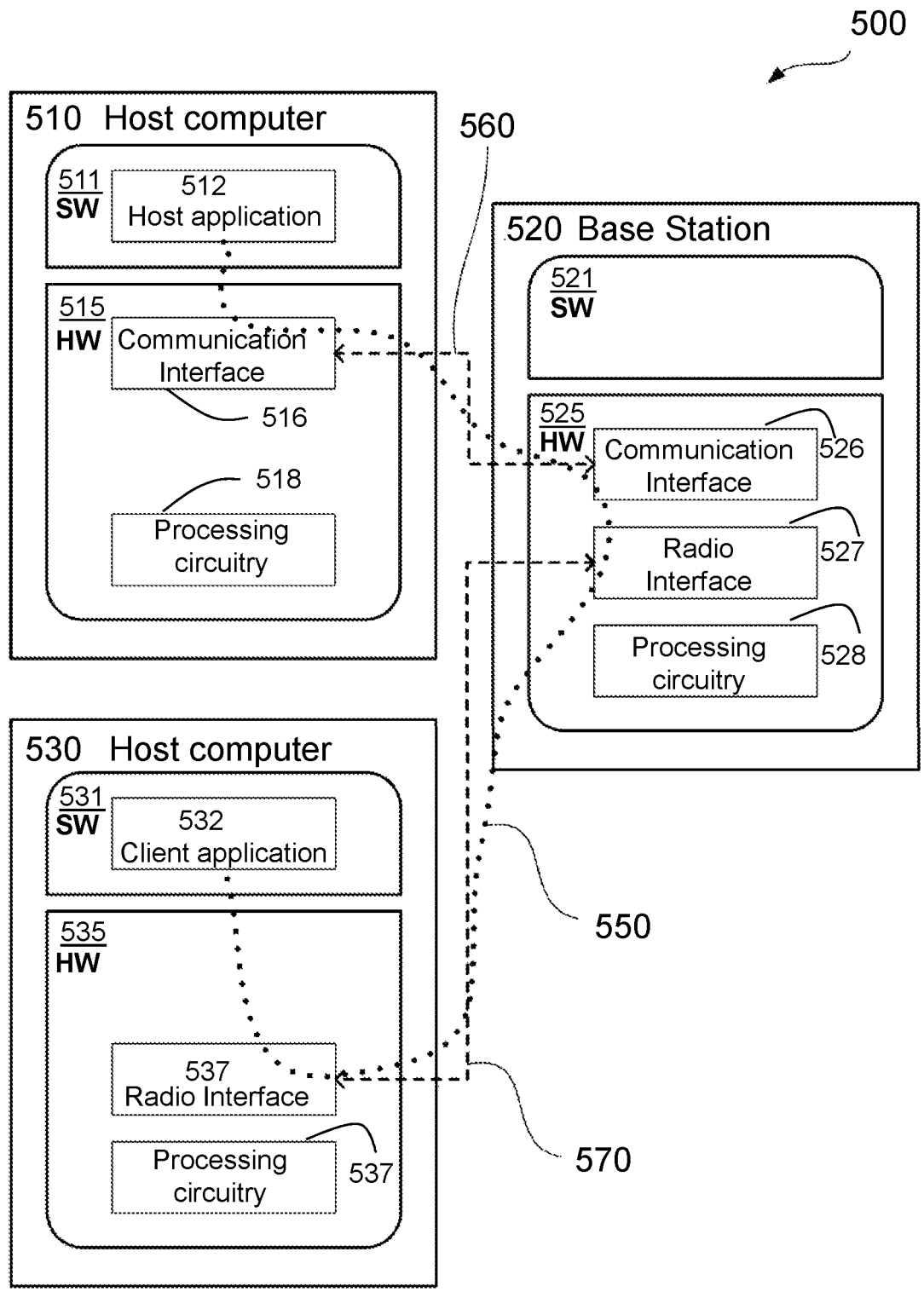
FIG. 10 illustrates a generalized block diagram of a host computer communicating via a base station with a user equipment over a partially wireless connection, according to certain embodiments.

FIG. 10 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 18) served by base station 520. Communication interface 526 may be configured to facilitate connection 560 to host computer 510. Connection 560 may be direct or it may pass through a core network (not shown in FIG. 18) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 17:
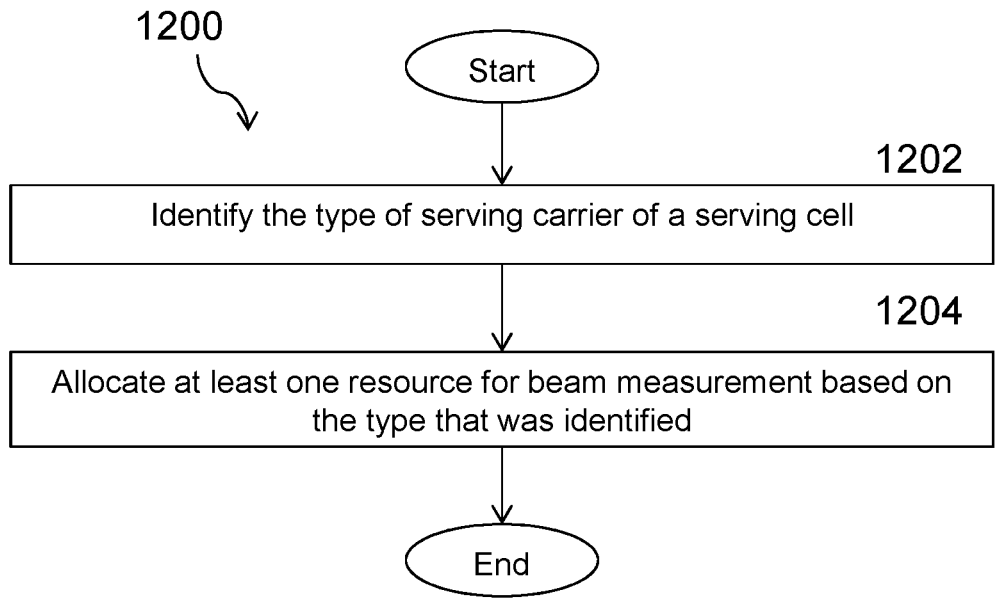
FIG. 17 illustrates another example method by a wireless device for controlling adaptive beam measurement capability, according to certain embodiments.

It is noted that host computer 510, base station 520 and UE 530 illustrated in FIG. 10 may be similar or identical to host computer 430, one of base stations 412a, 412b, 412c and one of UEs 491, 492 of FIG. 17, respectively. This is to say, the inner workings of these entities may be as shown in FIG. 10 and independently, the surrounding network topology may be that of FIG. 9.

In FIG. 10, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 11, 12:
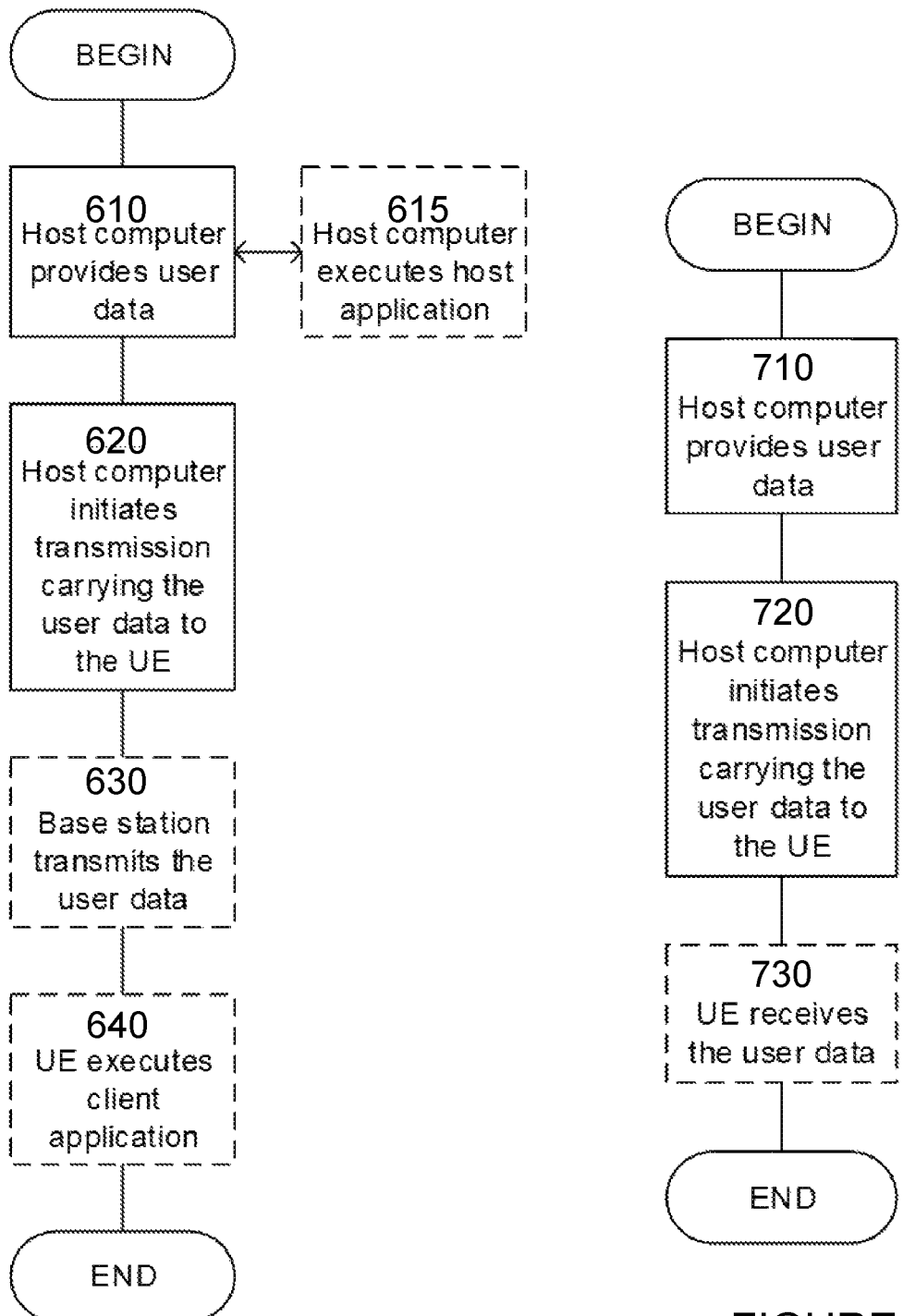
FIG. 11 illustrates a method implemented in a communication system, according to one embodiment.
FIG. 12 illustrates another method implemented in a communication system, according to one embodiment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 610, the host computer provides user data. In substep 615 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 12 is a flowchart illustrating another method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 13, 14:
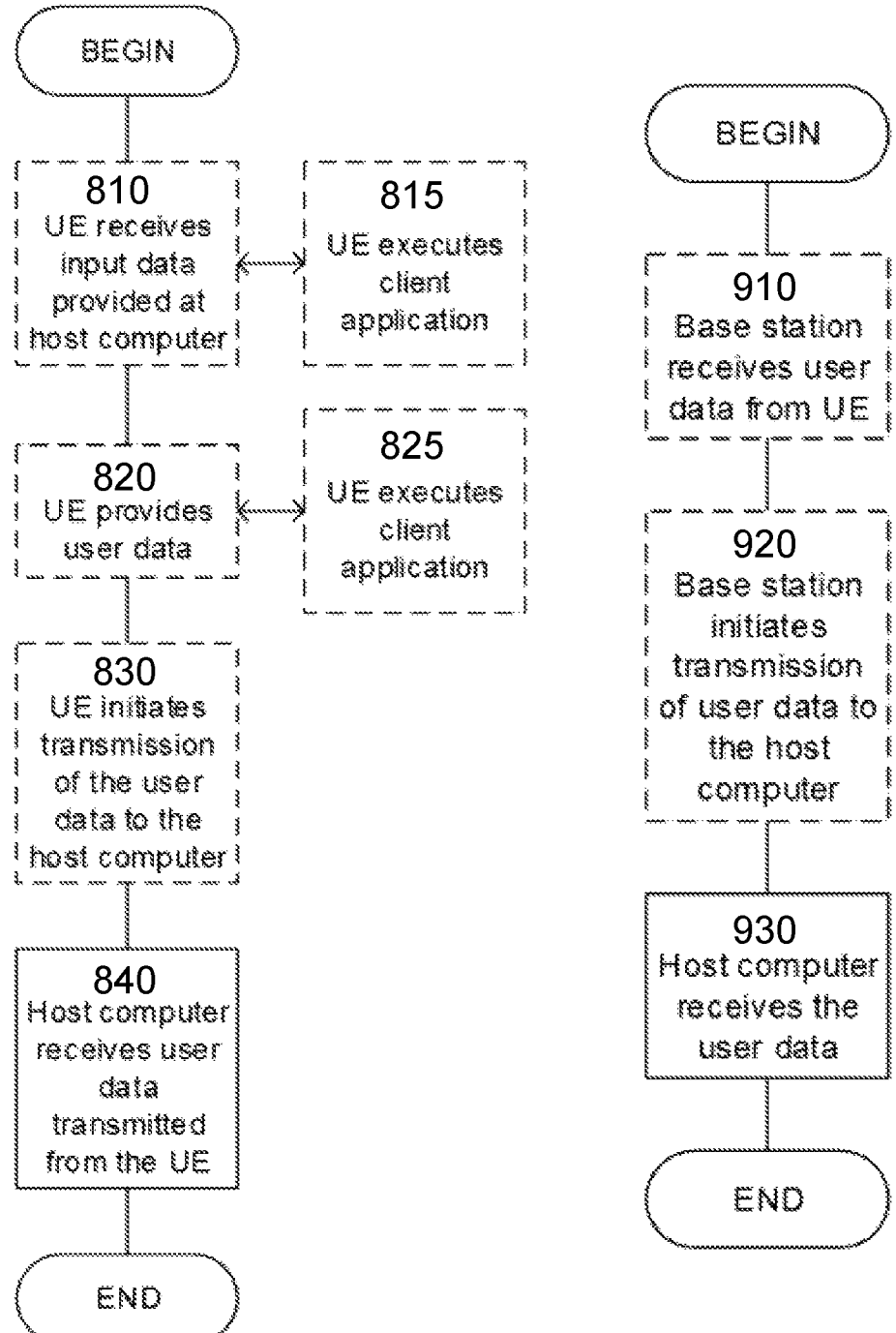
FIG. 13 illustrates another method implemented in a communication system, according to one embodiment.
FIG. 14 illustrates another method implemented in a communication system, according to one embodiment.

FIG. 13 is another flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 810 (which may be optional), the UE receives input data provided by the host computer. Additionally or alternatively, in step 820, the UE provides user data. In substep 825 (which may be optional) of step 820, the UE provides the user data by executing a client application. In substep 815 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 14 is a flowchart illustrating another method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 15:
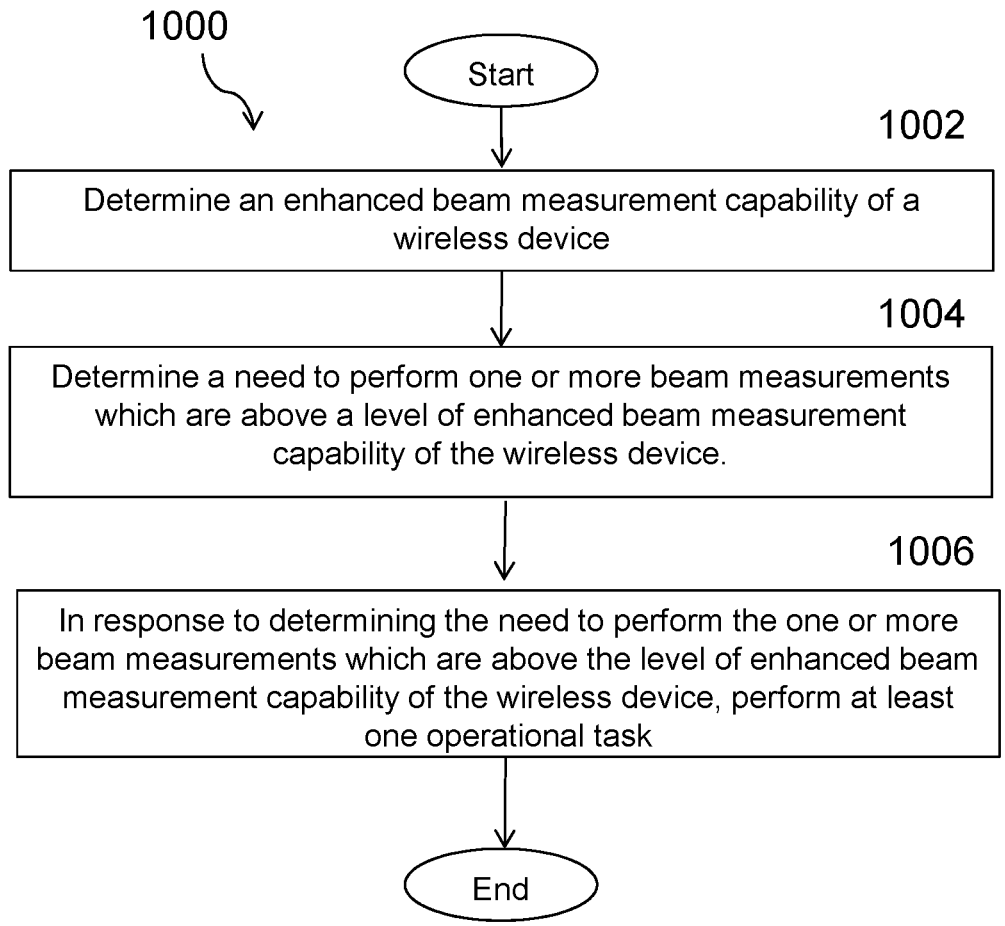
FIG. 15 illustrates an example method by a wireless device for controlling adaptive beam measurement capability, according to certain embodiments.

FIG. 15 depicts a method 1000 by a wireless device for controlling adaptive beam measurement capability, according to certain embodiments. In a particular embodiment, the wireless device is a UE.

The method may begin at step 1002 when the wireless device determines an enhanced beam measurement capability of the wireless device for at least one of: intra-frequency, inter-frequency, and inter-RAT. At step 1004, a need to perform one or more beam measurements which are above a level of the enhanced beam measurement capability of the wireless device is determined. In response to determining the need to perform the one or more beam measurements which are above the level of enhanced beam measurement capability of the wireless device, at least one operational task is performed, at step 1006.

FIG. 16 illustrates a schematic block diagram of an apparatus 1100 in a wireless network (for example, the wireless network shown in FIGS. 1 and 4). The apparatus may be implemented in a wireless device or network node (e.g., wireless device 110 or network node 160 shown in FIG. 4). Apparatus 1100 is operable to carry out the example method described with reference to FIG. 15 and possibly any other processes or methods disclosed herein. It is also to be understood that the method of FIG. 15 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first determining module 1110, second determining module 1120, performing module 1130, and any other suitable units of apparatus 1100 to perform corresponding functions according one or more embodiments of the present disclosure.

According to certain embodiments, first determining module 1110 may perform certain of the determining functions of the apparatus 1100. For example, first determining module 1110 may determine an enhanced beam measurement capability of a wireless device.

Second determining module 1120 may perform certain other of the determining functions of apparatus 1100. For example, second determining module 1120 may determine a need to perform one or more beam measurements which are above a level of enhanced beam measurement capability of the wireless device.

Performing module 1130 may perform certain of the performing functions of apparatus 1100. For example, performing module 1130 may perform one or more operational tasks in response to determining the need to perform the one or more beam measurements, which are above the level of enhanced beam measurement capability of the wireless device. In a particular embodiment, for example, one or more configurations of the wireless device may be adjusted to perform the one or more beam measurements within the level of enhanced beam measurement capability of the wireless device.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FIG. 17 depicts another method 1200 by a wireless device 110 for controlling adaptive beam measurement capability, according to certain embodiments. In a particular embodiment, the wireless device is a UE.

The method may begin at step 1202 when the wireless device 110 identifies a type of serving carrier of a serving cell. At step 1204, the wireless device 110 allocates at least one resource for beam measurement based on the type that was identified.

In a particular embodiment, allocating the at least one resource may include allocating a first resource for the beam measurement on the PCC if the type of serving carrier of the serving cell is a component carrier of the PCC, allocating a second resource for the beam measurement on the PSCC if the type of serving carrier of the serving cell is a component carrier of the PSCC, and allocating a third resource for the beam measurement of the SCC if the type of serving carrier of the serving cell is a component carrier of a SCC. In a further particular embodiment, the first resource may include at least one resource for performing a first number of beam measurements on the PCC, the second resource may include at least one resource for performing a second number of beam measurements on the PSCC, and the third resource may include at least one resource for performing a third number of beam measurements on the SCC.

In another particular embodiment, allocating the at least one resource may include allocating a first resource for the beam measurement on the PCC if the type of serving carrier of the serving cell is a component carrier of the PCC, allocating a second resource for the beam measurement on the PSCC if the type of serving carrier of the serving cell is a component carrier of the PSCC, allocating a third resource for the beam measurement of the SCC if the type of serving carrier of the serving cell is a component carrier of a SCC and a PCC or PSCC is configured, allocating a fourth resource for the beam measurement of the SCC if the type of serving carrier of the serving cell is a component carrier of a secondary cell (SCC) and no PCC or PSCC is configured. In a further particular embodiment, the first resource may include at least one resource for performing a first number of beam measurements on the PCC, the second resource may include at least one resource for performing a second number of beam measurements on the PSCC, the third resource may include at least one resource for performing a third number of beam measurements on the SCC, and the fourth resource may include at least one resource for performing a fourth number of beam measurements on the SCC.

In a particular embodiment, the method may further include the wireless device 110 performing at least one beam measurement using the at least one resource allocated based on the type that was identified performing at least one RSRP measurement, at least one RSRQ measurement, and/or at least one SINR measurement.

In a particular embodiment, allocating the at least one resource may include allocating an amount of memory or buffers to perform the beam measurement, allocating an amount of processing resources to perform the beam measurement, and/or distributing or scheduling at least one task associated with the beam measurement.

Figure 18:
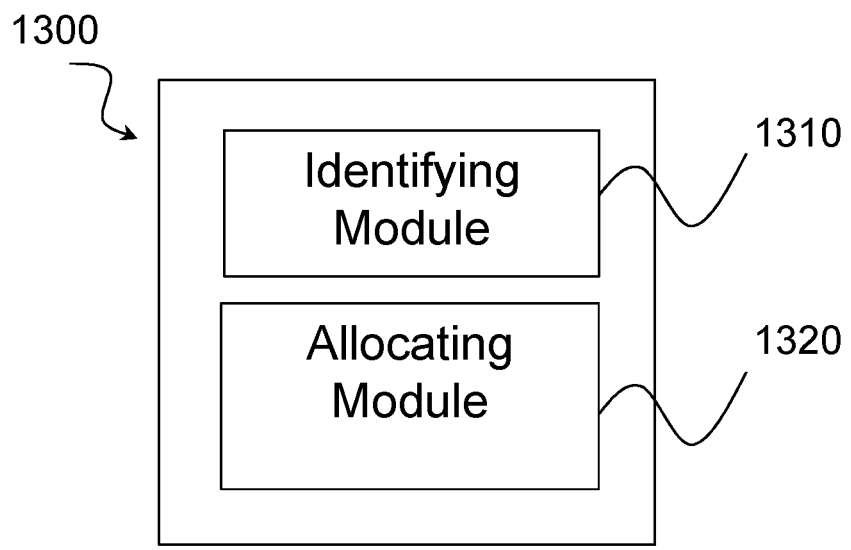
FIG. 18 illustrates another exemplary virtual computing device for controlling adaptive beam measurement capability, according to certain embodiments.

FIG. 18 illustrates a schematic block diagram of an apparatus 1300 in a wireless network (for example, the wireless network shown in FIGS. 1 and 4). The apparatus may be implemented in a wireless device such as wireless device 110 shown in FIG. 4. Apparatus 1300 is operable to carry out the example method described with reference to FIG. 17 and possibly any other processes or methods disclosed herein. It is also to be understood that the method of FIG. 17 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause identifying module 1310, allocating module 1320, and any other suitable units of apparatus 1300 to perform corresponding functions according one or more embodiments of the present disclosure.

According to certain embodiments, identifying module 1310 may perform certain of the identifying functions of the apparatus 1300. For example, identifying module 1310 may identify a type of serving carrier of a serving cell.

According to certain embodiments, allocating module 1320 may perform certain of the allocating functions of apparatus 1300. For example, allocating module 1320 may allocate at least one resource for beam measurement based on the type that was identified.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 19:
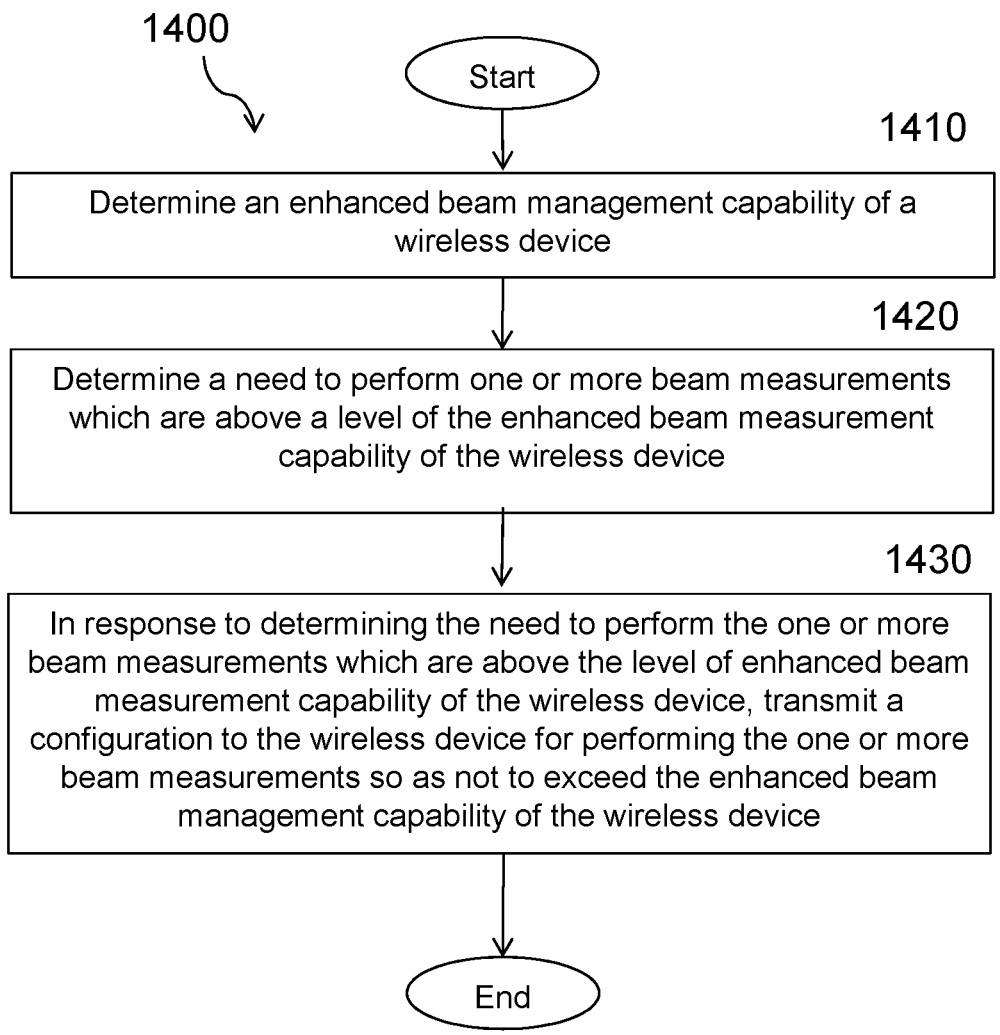
FIG. 19 illustrates an example method by a network node for controlling adaptive beam measurement capability of a wireless device, according to certain embodiments.

FIG. 19 depicts a method 1400 by a network node for controlling an adaptive beam measurement capability of a wireless device. The method begins at step 1410 when the network node determines an enhanced beam management capability of the wireless device. At step 1420, the network node determines a need of the wireless device to perform one or more beam measurements which are above a level of the enhanced beam measurement capability of the wireless device. At step 1430, a configuration for performing the one or more beam measurements so as not to exceed the enhanced beam management capability of the wireless device is transmitted to the wireless device.

Figure 20:
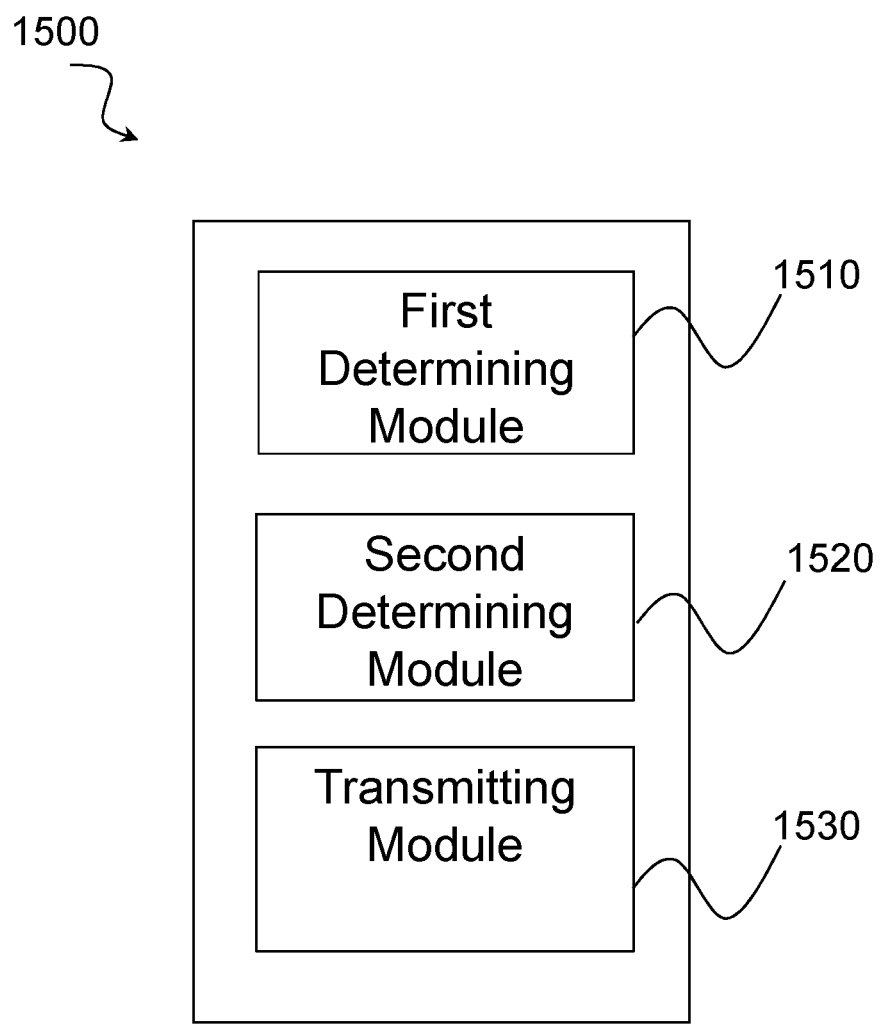
FIG. 20 illustrates an exemplary virtual computing device for controlling adaptive beam measurement capability of a wireless device, according to certain embodiments.

FIG. 20 illustrates a schematic block diagram of an apparatus 1500 in a wireless network (for example, the wireless network shown in FIG. 4). The apparatus may be implemented in a wireless device or network node (e.g., wireless device 110 or network node 160 shown in FIG. 4). Apparatus 1500 is operable to carry out the example method described with reference to FIG. 19 and possibly any other processes or methods disclosed herein. It is also to be understood that the method of FIG. 19 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first determining module 1510, second determining module 1520, transmitting module 1530, and any other suitable units of apparatus 1500 to perform corresponding functions according one or more embodiments of the present disclosure.

According to certain embodiments, first determining module 1510 may perform certain of the determining functions of apparatus 1500. For example, first determining module 1510 may determine an enhanced beam management capability of the wireless device.

Second determining module 1520 may perform certain other of the determining functions of apparatus 1500. For example, second determining module 1520 may determine a need of the wireless device to perform one or more beam measurements which are above a level of the enhanced beam measurement capability of the wireless device.

Transmitting module 1530 may perform certain of the performing functions of apparatus 1500. For example, transmitting module 1530 may transmit, to the wireless device, a configuration for performing the one or more beam measurements so as not to exceed the enhanced beam management capability of the wireless device.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 21:
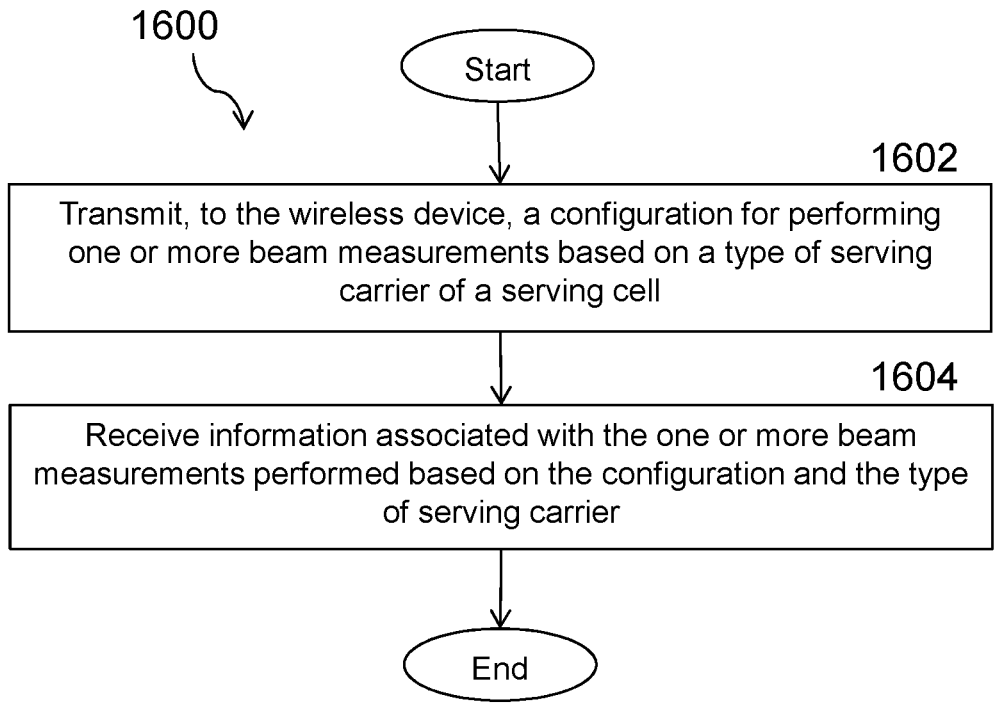
FIG. 21 illustrates another example method by a network node for controlling adaptive beam measurement capability of a wireless device, according to certain embodiments.

FIG. 21 depicts a method 1600 by a network node 160 for controlling an adaptive beam measurement capability of a wireless device. The method begins at step 1602 when the network node 160 transmits, to the wireless device 110, a configuration for performing one or more beam measurements based on a type of serving carrier of a serving cell. At step 1604, network node 160 receives information associated with the one or more beam measurements performed based on the configuration and the type of serving carrier.

In a particular embodiment, the configuration may include an allocation of a first resource for the beam measurement on the PCC if the type of serving carrier of the serving cell is a component carrier of the PCC, an allocation of a second resource for the beam measurement on the PSCC if the type of serving carrier of the serving cell is a component carrier of the PSCC, and an allocation of a third resource for the beam measurement of the SCC if the type of serving carrier of the serving cell is a component carrier of a SCC. In a further particular embodiment, the first resource may include at least one resource for performing a first number of beam measurements on the PCC, the second resource may include at least one resource for performing a second number of beam measurements on the PSCC, and the third resource may include at least one resource for performing a third number of beam measurements on the SCC.

In another particular embodiment, the configuration may include an allocation of a first resource for the beam measurement on the PCC if the type of serving carrier of the serving cell is a component carrier of the PCC, an allocation of a second resource for the beam measurement on the PSCC if the type of serving carrier of the serving cell is a component carrier of the PSCC, an allocation of a third resource for the beam measurement of the SCC if the type of serving carrier of the serving cell is a component carrier of a SCC and a PCC or PSCC is configured, and an allocation of a fourth resource for the beam measurement of the SCC if the type of serving carrier of the serving cell is a component carrier of a SCC and no PCC or PSCC is configured. In a further particular embodiment, the first resource may include at least one resource for performing a first number of beam measurements on the PCC, the second resource may include at least one resource for performing a second number of beam measurements on the PSCC, the third resource may include at least one resource for performing a third number of beam measurements on the SCC, and the fourth resource may include at least one resource for performing a fourth number of beam measurements on the SCC.

In a particular embodiment, the information includes at least one RSRP measurement, at least one RSRQ measurement, and/or at least one SINR measurement.

In a particular embodiment, the at least one resource may include an amount of memory or buffers to perform the at least one beam measurement, an amount of processing resources to perform the at least one beam measurement, and/or at least one task associated with the at least one beam measurement.

Figure 22:
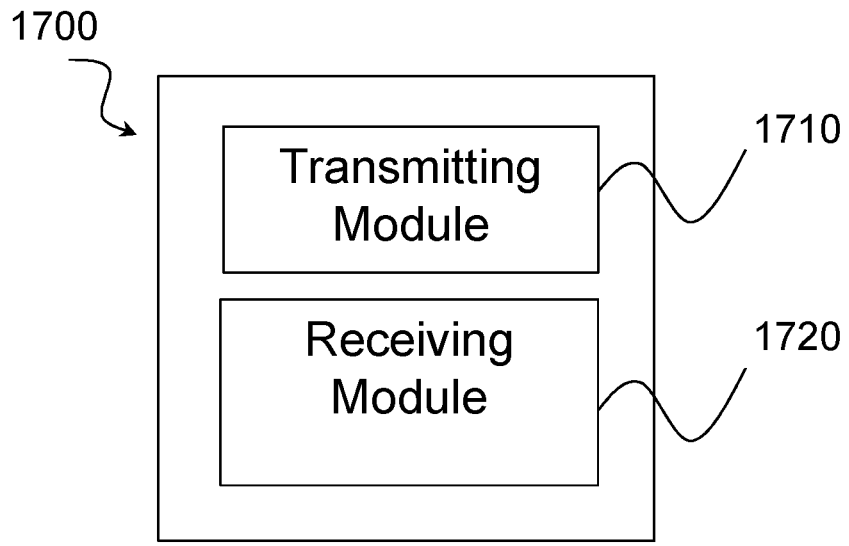
FIG. 22 illustrates another exemplary virtual computing device for controlling adaptive beam measurement capability of a wireless device, according to certain embodiments.

FIG. 22 illustrates a schematic block diagram of an apparatus 1700 in a wireless network (for example, the wireless network shown in FIG. 4). The apparatus may be implemented in a network node such as, for example, network node 160 shown in FIG. 4. Apparatus 1700 is operable to carry out the example method described with reference to FIG. 21 and possibly any other processes or methods disclosed herein. It is also to be understood that the method of FIG. 21 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 1710, receiving module 1720, and any other suitable units of apparatus 1700 to perform corresponding functions according one or more embodiments of the present disclosure.

According to certain embodiments, transmitting module 1710 may perform the transmitting functions of apparatus 1700. For example, transmitting module 1710 may transmit, to the wireless device 110, a configuration for performing one or more beam measurements based on a type of serving carrier of a serving cell.

Receiving module 1720 may perform the receiving functions of apparatus 1700. For example, receiving module 1720 may receive information associated with the one or more beam measurements performed based on the configuration and the type of serving carrier.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 23:
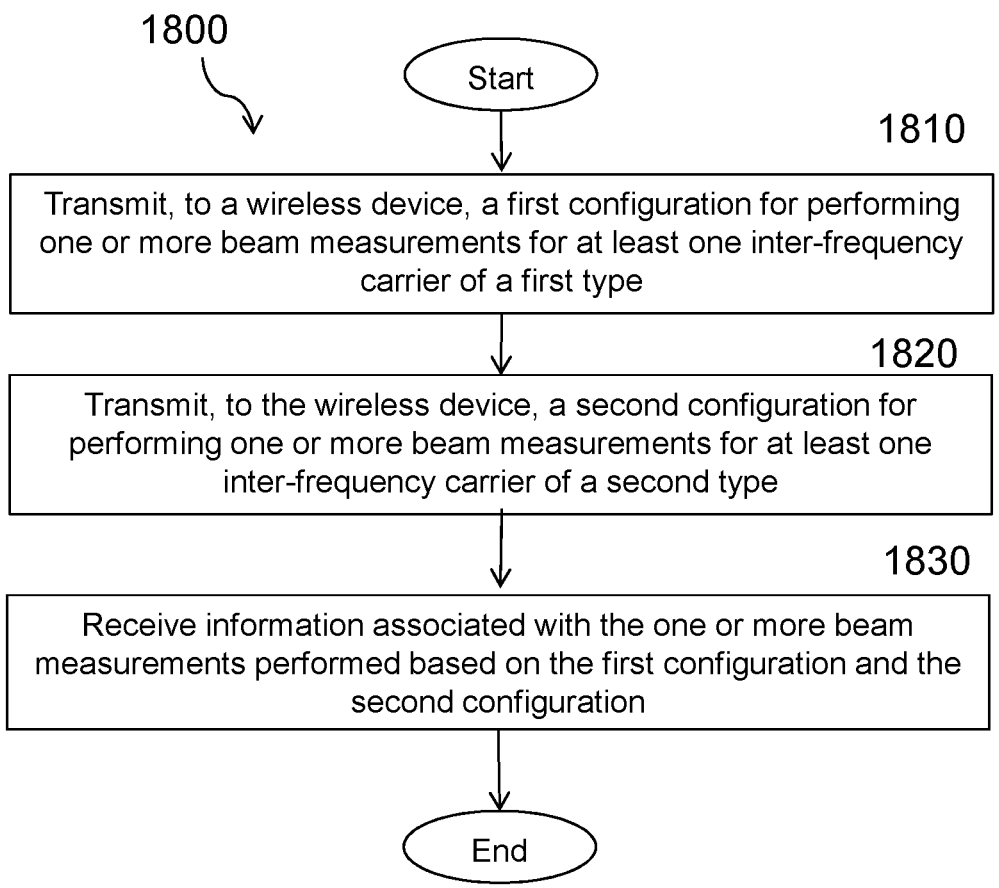
FIG. 23 illustrates another example method by a network node for controlling adaptive beam measurement capability of a wireless device, according to certain emobidments.

FIG. 23 depicts a method 1800 by a network node 160 for controlling an adaptive beam measurement capability of a wireless device. The method begins at step 1810 when the network node 160 transmits, to the wireless device 110, a first configuration for performing one or more beam measurements for at least one inter-frequency carrier of a first type. At step 1820, network node 160 transmits, to the wireless device 110, a second configuration for performing one or more beam measurements for at least one inter-frequency carrier of a second type. At step 1830, network node 160 receives information associated with the one or more beam measurements performed based on the first configuration and the second configuration.

In a particular embodiment, the one or more beam measurements for the at least one inter-frequency carrier of the first type comprise a first number of beam measurements, and the one or more beam measurements for the at least one inter-frequency carrier of the second type comprises a second number of beam measurements.

In a particular embodiment, the first type comprises at least one inter-RAT carrier of a first type and the second type comprises at least one inter-RAT carrier of a second type.

In a particular embodiment, the inter-frequency carrier of the first type is measured by the wireless device in a first RRC state and the inter-frequency carrier of the second type is measured by the wireless device in a second RRC state that is different from the first RRC state.

In a particular embodiment, the first number of beam measurements and the second number of beam measurements are the same.

In a particular embodiment, the first number of beam measurements and the second number of beam measurements are different.

In a particular embodiment, the first type comprises a first type of signals and the second type comprises a second type of signals.

In a particular embodiment, the first type of signals comprise SSB and the second type of signals comprise CSI-RS.

Figure 24:
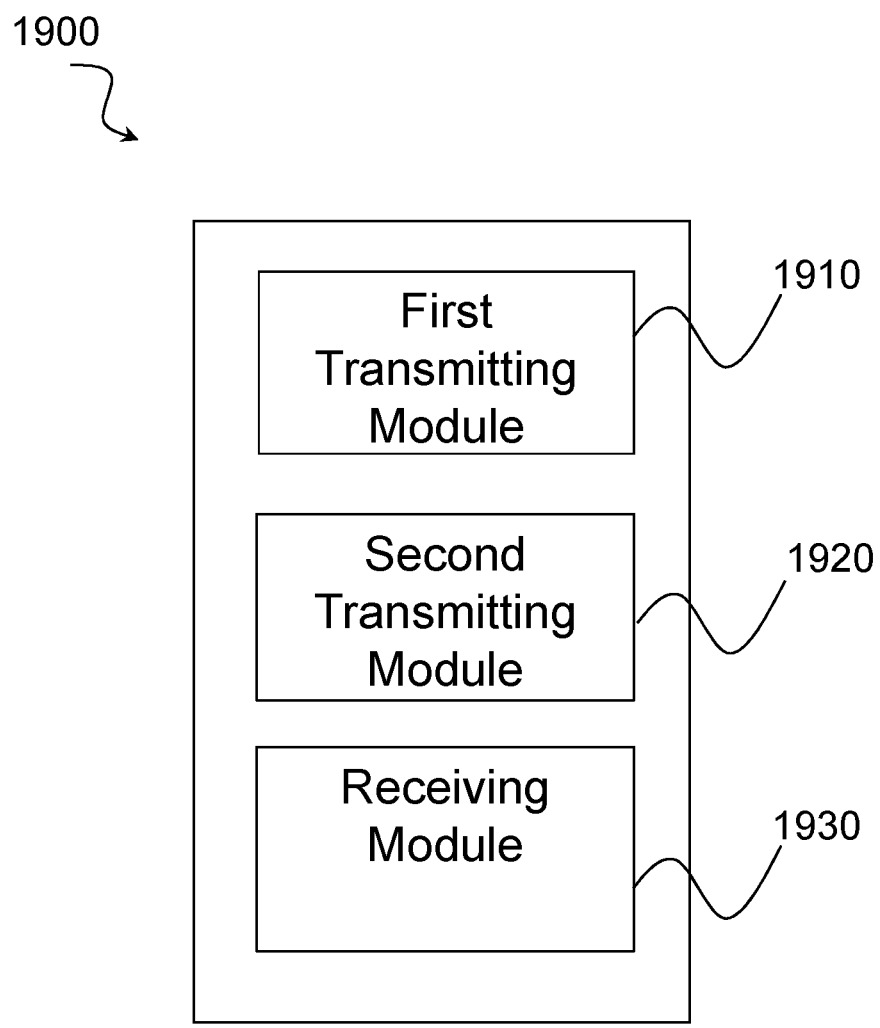
FIG. 24 illustrates a schematic block diagram of an apparatus, according to certain embodiments.

FIG. 24 illustrates a schematic block diagram of an apparatus 1900 in a wireless network (for example, the wireless network shown in FIG. 4). The apparatus may be implemented in a network node such as, for example, network node 160 shown in FIG. 4. Apparatus 1900 is operable to carry out the example method described with reference to FIG. 23 and possibly any other processes or methods disclosed herein. It is also to be understood that the method of FIG. 23 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first transmitting module 1910, second transmitting module 1920, receiving module 1930, and any other suitable units of apparatus 1900 to perform corresponding functions according one or more embodiments of the present disclosure.

According to certain embodiments, first transmitting module 1910 may perform certain of the transmitting functions of apparatus 1900. For example, first transmitting module 1910 may transmit, to the wireless device 110, a first configuration for performing one or more beam measurements for at least one inter-frequency carrier of a first type.

According to certain embodiments, second transmitting module 1920 may perform certain of the transmitting functions of apparatus 1900. For example, second transmitting module 1920 may transmit, to the wireless device 110, a second configuration for performing one or more beam measurements for at least one inter-frequency carrier of a second type.

Receiving module 1930 may perform the receiving functions of apparatus 1900, For example, receiving module 1930 may receive information associated with the one or more beam measurements performed based on the first configuration and the second configuration.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Example Embodiments

According to certain embodiments, the UE may support and operate according to the enhanced UE beam measurement capability for at least one of intra-frequency, inter-frequency, and inter-RAT. The beam measurement capability of the UE can be adapted based on a number of carriers and/or the type of carriers configured for the beam measurements and/or based on the current CA configuration in the UE and/or coverage level (e.g., the set of configured CCs, activated CCs, deactivated CCs, UE activity level configuration (e.g., DRX or non-DRX, DRX cycle below a threshold or DRX cycle above the threshold), DRX state of the master cell group (MGC), DRX state of the secondary cell group (SCG) etc.). This is described with the following exemplary embodiments:

In a particular embodiment, the UE beam measurement capability may further comprise X1 beam measurements over all intra-frequency carriers of a first type and X2 beam measurements over all intra-frequency carriers of a second type. In general, there may be n (n>1) types of intra-frequency beam measurements and correspondingly X1, X2, . . . , Xn, e.g.:

the first type corresponds to the total number of beam measurements over all configured and also activated carrier components (CCs) and the second type corresponds to the total number of beam measurements over all configured but deactivated carrier components the first type corresponds to the total number of beam measurements at a first coverage level (e.g., normal coverage) and the second type corresponds to the total number of beam measurements over a second coverage level (e.g., enhanced coverage level)

the first type corresponds to the total number of beam measurements over all configured CCs in normal coverage and the second type corresponds to the total number of beam measurements over all configured CCs in enhanced coverage the first type corresponds to the total number of beam measurement over all configured CCs in non DRX operation, or operating with DRX cycle shorter than a threshold, and the second type corresponds to the total number of beam measurements over all configured CCs in DRX operation or operating with DRX cycle greater than or equal to a threshold.

In another particular embodiment, the UE beam measurement capability may further comprise Y1 beam measurements over all inter-frequency carriers of a first type and Y2 beam measurements over all inter-frequency carriers of a second type. In general, there may be m (m>1) types of inter-frequency beam measurements and correspondingly Y1, Y2, . . . , Ym.

In yet another particular embodiment, the UE beam measurement may further comprise Z1 beam measurements over all inter-RAT carriers of a first type and Z2 beam measurements over all inter-RAT carriers of a second type. In general, there may be k (k>1) types of inter-RAT beam measurements and correspondingly Z1, Z2, . . . , Zk. Z1, Z2, . . . , Zk may be defined for a single RAT.

As another example, according to certain embodiments, a network node may adapt the UE configuration, based on the enhanced beam measurement capability, so it is not exceeded.

Some Additional embodiments are now described:

Embodiment 1

A method by a wireless device for controlling adaptive beam measurement capability, the method comprising:
determining an enhanced beam measurement capability of the wireless device for at least one of: intra-frequency, inter-frequency, and inter-RAT;
determining a need to perform one or more beam measurements which are above a level of the enhanced beam measurement capability of the wireless device; and
in response to determining the need to perform the one or more beam measurements which are above the level of enhanced beam measurement capability of the wireless device, performing at least one operational task.

Embodiment 2

The method of embodiment 1, wherein the enhanced beam measurement capability is determined based on a UE configuration received from a network node.

Embodiment 3

The method of embodiment 1, wherein the enhanced beam measurement capability is determined autonomously by the wireless device.

Embodiment 4

The method of any one of embodiments 1 to 3, wherein performing the at least one operational task comprises adjusting a UE configuration to meet the enhanced beam measurement capability.

Embodiment 5

The method of any one of embodiments 1 to 4, wherein performing the at least one operation task comprises controlling a measurement configuration which should not exceed the level of enhanced beam measurement capability.

Embodiment 6

The method of any one of embodiments 1 to 5, further comprising transmitting an indication of the enhanced beam measurement capability to a network node.

Embodiment 7

The method of embodiment 6, wherein the indication is transmitted in response to a request from the network node.

Embodiment 8

The method of embodiment 6, wherein the indication is transmitted in response to the wireless device detecting a triggering event.

Embodiment 9

The method of any one of embodiments 1 to 8, wherein the enhanced beam measurement capability is associated with a current UE configuration, a reference UE configuration, or a preferred UE configuration.

Embodiment 10

The method of any one of embodiments 1 to 9, wherein the at least one operational task comprises one or more of:
receiving a signal on which the one or more beam measurements are to be performed;
allocating an amount of memory or buffers to perform the one or more beam measurements;

allocating an amount of processing resources to perform the one or more beam measurements;
configuring one or more receivers or transmitters in one or more time resources to be able to receive or transmit the signals/channels while not exceeding the determined enhanced beam measurement capability;
using or controlling power or energy to support the enhanced beam measurement capability;
distributing or scheduling at least one task associated with the one or more beam measurements related tasks to support the enhanced beam measurement capability;
receiving or transmitting over a certain total bandwidth and carrier frequency combinations associated with the enhanced beam measurement capability to perform the one or more beam measurements;
meeting one or more performance-related requirements corresponding to the enhanced beam measurement capability;
performing the one or more beam measurements with a quality or accuracy that is not lower than what is required and/or within the time not longer than a pre-defined measurement time period.

Embodiment 11

The method of any one of embodiments 1 to 10, wherein the at least one operational task is performed over a particular period of time period or during one or more time resources.

Embodiment 12

The method of any one of embodiments 1 to 11, wherein the at least one operation task comprises performing an amount of the one or more beam measurements that is within the enhanced beam measurement capability, wherein the performing may further comprise one or more of:
reporting a result of the performed amount of the one or more beam measurements to higher layers and/or to another node; and
using a result of the performed amount of the one or more beam measurements for performing one or more of RRM, mobility, handover, beam management, RLM, positioning, MDT.

Embodiment 13

The method of any one of embodiments 1 to 12, wherein the at least one operational task comprises:
sending a message to another node indicating that the enhanced beam measurement capability has been exceeded;
saving a record indicating that the enhanced beam measurement capability has been exceeded;
extending a measurement period;
delaying or postponing a beginning the at least one beam measurement until some other measurement is complete and the enhanced beam measurement capability is not exceeded anymore;
dropping the at least one beam measurement;
not starting measurements on a new intra-frequency carrier unless (or until) the enhanced beam measurement capability is not exceeded for any in-use intra-frequency carriers for an intra-frequency beam measurement;
not configuring and/or activating more component carriers when a number of configured and/or activated component carriers is above a number of configured and/or activated CCs associated with the enhanced beam measurement capability.

Embodiment 14

A computer program comprising instructions which when executed on a computer perform any of the methods of embodiments 1 to 13.

Embodiment 15

A computer program product comprising computer program, the computer program comprising instructions which when executed on a computer perform any of the methods of embodiments 1 to 13.

Embodiment 16

A non-transitory computer readable medium storing instructions which when executed by a computer perform any of the methods of embodiments 1 to 13.

Embodiment 17

A wireless device for controlling adaptive beam measurement capability, the wireless device comprising:
memory operable to store instructions; and
processing circuitry operable to execute the instructions to cause the wireless device to perform any of embodiments 1 to 13.

Embodiment 18

A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of embodiments 1 to 13.

Embodiment 19

The communication system of embodiment 18, wherein the cellular network further includes a base station configured to communicate with the UE.

Embodiment 20

The communication system of any of embodiments 18 to 19, wherein:
the processing circuitry of the host computer is configured to execute a host application, thereby providing the user data; and
the UE's processing circuitry is configured to execute a client application associated with the host application.

Embodiment 21

A method implemented in a communication system including a host computer, a base station and a user equipment (UE), the method comprising:

at the host computer, providing user data; and
at the host computer, initiating a transmission carrying the user data to the UE via a cellular network comprising the base station, wherein the UE performs any of the steps of any of embodiments 1 to 13.

Embodiment 22

The method of embodiment 21, further comprising at the UE, receiving the user data from the base station.

Embodiment 23

A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of embodiments 1 to 13.

Embodiment 24

The communication system of the embodiment 23, further including the UE.

Embodiment 25

The communication system of any of embodiments 23 to 24, further including the base station, wherein the base station comprises a radio interface configured to communicate with the UE and a communication interface configured to forward to the host computer the user data carried by a transmission from the UE to the base station.

Embodiment 26

The communication system of any of embodiments 24 to 25, wherein:
the processing circuitry of the host computer is configured to execute a host application; and
the UE's processing circuitry is configured to execute a client application associated with the host application, thereby providing the user data.

Embodiment 27

The communication system of any of embodiments 24 to 26, wherein:
the processing circuitry of the host computer is configured to execute a host application, thereby providing request data; and
the UE's processing circuitry is configured to execute a client application associated with the host application, thereby providing the user data in response to the request data.

Embodiment 28

A method implemented in a communication system including a host computer, a base station and a user equipment (UE), the method comprising:
at the host computer, receiving user data transmitted to the base station from the UE, wherein the UE performs any of the steps of any of embodiments 1 to 13.

Embodiment 29

The method of embodiment 28, further comprising, at the UE, providing the user data to the base station.

Embodiment 30

The method of the any of embodiments 28 to 29, further comprising:
at the UE, executing a client application, thereby providing the user data to be transmitted; and
at the host computer, executing a host application associated with the client application.

Embodiment 31

The method of any one of embodiments 28 to 30, further comprising:
at the UE, executing a client application; and
at the UE, receiving input data to the client application, the input data being provided at the host computer by executing a host application associated with the client application,
wherein the user data to be transmitted is provided by the client application in response to the input data.

Embodiment 32

A method by a network node for controlling an adaptive beam measurement capability of a wireless device, the method comprising:
determining an enhanced beam management capability of the wireless device;
determining a need of the wireless device to perform one or more beam measurements which are above a level of the enhanced beam measurement capability of the wireless device; and
transmitting, to the wireless device, a configuration for performing one or more beam measurements so as not to exceed the enhanced beam management capability of the wireless device.

Embodiment 33

The method of embodiment 32, wherein the enhanced beam management capability is determined based on an indication received from the wireless device or another network node.

Embodiment 34

The method of embodiment 32, wherein the configuration comprises at least one of a number of carriers, a carrier aggregation combination, a number of component carriers, a number of activated component carriers, a number of deactivated component carriers, a number of measurement objects associated with a carrier, a DRX operation.

Embodiment 35

The method of embodiment 32, wherein the configuration comprises:
a number of component carriers that is less than a threshold number of carriers if the enhanced beam measurements capability becomes exceeded; or
an amount of beam measurements per carrier.

Embodiment 36

The method of embodiments 32 to 35, wherein the configuration deactivates at least one active carrier in the wireless device.

Embodiment 37

The method of embodiments 32 to 36, wherein the enhanced beam measurement capability comprises:
- a first type corresponding to a number of beam measurements per carrier (e.g., X1_a for carrier frequency 'a', X1_b for carrier frequency 'b', etc. where X1_a may be the same or different from X1_b) and
- a second type corresponding to a total number of beam measurements X2 over all configured component carriers for up to Q number of component carriers so that the wireless device shall be capable of the combined capability min(X2, (X1_a+X1_b+ . . . )) wherein the combined capability becomes dependent on the LIE configuration which is defined for up to Q number of component carriers (which therefore needs to be controlled by the network node and or UE to not be exceeded).

Embodiment 38

The method of embodiments 32 to 37, wherein the configuration reduces an amount of beam measurements to be performed by the wireless device to a level associated with the enhanced beam measurement capability.

Embodiment 39

The method of embodiments 32 to 37, wherein the configuration controls a coverage level of the wireless device for performing an amount of beam measurements above a threshold.

Embodiment 40

A computer program comprising instructions which when executed on a computer perform any of the methods of embodiments 32 to 37.

Embodiment 41

A computer program product comprising computer program, the computer program comprising instructions which when executed on a computer perform any of the methods of embodiments 32 to 37.

Embodiment 42

A non-transitory computer readable medium storing instructions which when executed by a computer perform any of the methods of embodiments 32 to 37.

Embodiment 43

A network node for controlling an adaptive beam measurement capability of a wireless device, the network node comprising:
- memory operable to store instructions; and
- processing circuitry operable to execute the instructions to cause the network node to perform any of embodiments 32 to 37.

Embodiment 44

A communication system including a host computer comprising:
- processing circuitry configured to provide user data; and
- a communication interface configured to forward the user data to a cellular network for transmission to a user equipment WE),
- wherein the cellular network comprises a base station having a radio interface and processing circuitry, the base station's processing circuitry configured to perform any of the steps of any of embodiments 32 to 37.

Embodiment 45

The communication system of the embodiment 44, further including the base station.

Embodiment 46

The communication system of any one of embodiments 44 to 45, further including the UE, wherein the UE is configured to communicate with the base station.

Embodiment 47

The communication system of any one of embodiments 44 to 46, wherein:
- the processing circuitry of the host computer is configured to execute a host application, thereby providing the user data; and
- the UE comprises processing circuitry configured to execute a client application associated with the host application.

Embodiment 48

A method implemented in a communication system including a host computer, a base station and a user equipment (UE), the method comprising:
- at the host computer, providing user data; and
- at the host computer, initiating a transmission carrying the user data to the UE via a cellular network comprising the base station, wherein the base station performs any of the steps of any of embodiments 32 to 37.

Embodiment 49

The method of embodiment 48, further comprising, at the base station, transmitting the user data.

Embodiment 50

The method of the embodiments 48 to 49, wherein the user data is provided at the host computer by executing a host application, the method further comprising, at the UE, executing a client application associated with the host application.

Embodiment 51

A user equipment (UE) configured to communicate with a base station, the UE comprising a radio interface and processing circuitry configured to performs the steps of any one of embodiments 48 to 51.

Embodiment 52

A communication system including a host computer comprising a communication interface configured to receive user data originating from a transmission from a user equipment (UE) to a base station, wherein the base station comprises a radio interface and processing circuitry, the base stations processing circuitry configured to perform any of the steps of any of embodiments 48 to 51.

Embodiment 51

The communication system of the embodiment 52 further including the base station.

Embodiment 54

The communication system of any one of embodiments 52 to 53, further including the UE, wherein the UE is configured to communicate with the base station.

Embodiment 55

The communication system of any one of embodiments 52 to 54, wherein:
the processing circuitry of the host computer is configured to execute a host application;
the UE is configured to execute a client application associated with the host application, thereby providing the user data to be received by the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
1×RTT CDMA2000 1×Radio Transmission Technology
3GPP 3rd Generation Partnership Project
5G 5th Generation
5GS 5G System
5QI 5G QoS Identifier
ABS Almost Blank Subframe
AN Access Network
AN Access Node
ARQ Automatic Repeat Request
AS Access Stratum
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
EPS Evolved Packet System
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
S-NSSAI Single Network Slice Selection Assistance Information
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method by a wireless device for controlling adaptive beam measurement capability, the method comprising:
   identifying a type of serving carrier of a serving cell, the type of serving carrier including one of a component carrier of a secondary cell (SCC), a component carrier of a primary cell (PCC), and a component carrier of a primary secondary cell (PSCC); and
   allocating at least one resource for at least one beam measurement based on the type that was identified, the allocating the at least one resource including:
      allocating an amount of memory or buffers to perform the at least one beam measurement;
      allocating an amount of processing resources to perform the at least one beam measurement;
      allocating a first number of beam measurements for all configured component carriers (CCs) with a first discontinuous reception (DRX) configuration;
      allocating a second number of beam measurements for all configured CCs with a second discontinuous reception (DRX) configuration; and
      distributing or scheduling at least one task associated with the one or more beam measurement; and
   allocating the at least one resource for the at least one beam measurement including:
      determining whether at least one of a PCC and PSCC is configured;
      allocating a first resource for the at least one beam measurement of the SCC based on the type of serving carrier of the serving cell being a component carrier of a SCC, and a PCC or PSCC being configured;
      allocating a second resource for the at least one beam measurement of the SCC based on the type of serving carrier of the serving cell being a component carrier of a SCC, and no PCC or PSCC being configured; and
      performing the at least one beam measurement using the at least one resource allocated based on the type of serving carrier that was identified.

2. The method of claim 1, wherein allocating the at least one resource for beam measurement based on the type comprises:
   when the type of serving carrier of the serving cell is a component carrier of a PCC, allocating a first resource for the beam measurement on the PCC,
   when the type of serving carrier of the serving cell is a component carrier of a PSCC, allocating a second resource for the beam measurement on the PSCC, and
   when the type of serving carrier of the serving cell is a component carrier of a SCC, allocating a third resource for the beam measurement of the SCC.

3. The method of claim 2, wherein:
   the first resource comprises at least one resource for performing a first number of beam measurements on the PCC;
   the second resource comprises at least one resource for performing a second number of beam measurements on the PSCC; and
   the third resource comprises at least one resource for performing a third number of beam measurements on the SCC.

4. The method of claim 1, wherein allocating the at least one resource for beam measurement based on the type comprises:
   when the type of serving carrier of the serving cell is a component carrier of a PCC, allocating a first resource for the beam measurement on the PCC,
   when the type of serving carrier of the serving cell is a component carrier of a PSCC, allocating a second resource for the beam measurement on the PSCC,
   when the type of serving carrier of the serving cell is a component carrier of a SCC and a PCC or PSCC is configured, allocating a third resource for the beam measurement of the SCC; and
   when the type of serving carrier of the serving cell is a component carrier of a SCC and no PCC or PSCC is configured, allocating a fourth resource for the beam measurement of the SCC.

5. The method of claim 4, wherein:
   the first resource comprises at least one resource for performing a first number of beam measurements on the PCC;
   the second resource comprises at least one resource for performing a second number of beam measurements on the PSCC;
   the third resource comprises at least one resource for performing a third number of beam measurements on the SCC; and
   the fourth resource comprises at least one resource for performing a fourth number of beam measurements on the SCC.

6. The method of claim 1, wherein performing the at least one beam measurement comprises performing at least one Reference Signal Received Power (RSRP) measurement.

7. The method of claim 1, wherein performing the at least one beam measurement comprises performing at least one Reference Signal Received Quality (RSRQ) measurement.

8. The method of claim 1, wherein performing the at least one beam measurement comprises performing at least one Signal to Interference and Noise Ratio (SINR) measurement.

9. The method of claim 1, wherein performing the at least one beam measurement corresponds to measuring a secondary synchronization signal (SSS) in a syncronisation signal block (SSB).

10. The method of claim 1, wherein performing the at least one beam measurement corresponds to measuring a channel state information reference symbol (CSI-RS).

11. The method of claim 1, wherein allocating the at least one resource for the beam measurement based on the type that was identified comprises:
- allocating a first number of beam measurements for all configured and activated component carriers (CCs); and
- allocating a second number of beam measurements for all configured and deactivated CCs.

12. A wireless device for controlling adaptive beam measurement capability, the wireless device comprising:
- memory operable to store instructions; and
- processing circuitry operable to execute the instructions to cause the wireless device to:
  - identify a type of serving carrier of a serving cell, the type of serving carrier including one of a component carrier of a secondary cell (SCC), a component carrier of a primary cell (PCC), and a component carrier of a primary secondary cell (PSCC); and
  - allocate at least one resource for at least one beam measurement based on the type that was identified, the processing circuitry being operable to allocate the at least one resource by:
    - allocating an amount of memory or buffers to perform the at least one beam measurement;
    - allocating an amount of processing resources to perform the at least one beam measurement;
    - allocating a first number of beam measurements for all configured component carriers (CCs) with a first discontinuous reception (DRX) configuration, and allocating a second number of beam measurements for all configured CCs with a second discontinuous reception (DRX) configuration; and
    - distributing or scheduling at least one task associated with the at least one beam measurement;
- allocating the at least one resource for the at least one beam measurement including:
  - determining whether at least one of a PCC and PSCC is configured;
  - allocating a first resource for the beam measurement of the SCC based on the type of serving carrier of the serving cell being a component carrier of a SCC, and a PCC or PSCC being configured; and
  - allocating a second resource for the beam measurement of the SCC based on the type of serving carrier of the serving cell being a component carrier of a SCC, and no PCC or PSCC being configured; and
- performing the at least one beam measurement using the at least one resource allocated based on the type of serving carrier that was identified.

13. The wireless device of claim 12, wherein allocating the at least one resource for beam measurement based on the type comprises:
- when the type of serving carrier of the serving cell is a component carrier of a PCC, allocating a first resource for the beam measurement on the PCC,
- when the type of serving carrier of the serving cell is a component carrier of a PSCC, allocating a second resource for the beam measurement on the PSCC, and
- when the type of serving carrier of the serving cell is a component carrier of a SCC, allocating a third resource for the beam measurement of the SCC.

14. A method by a network node for controlling an adaptive beam measurement capability of a wireless device, the method comprising:
- transmitting, to the wireless device, a configuration for performing one or more beam measurements based on a type of serving carrier of a serving cell, the type of serving carrier including one of a component carrier of a secondary cell (SCC), a component carrier of a primary cell (PCC), and a component carrier of a primary secondary cell (PSCC);
- the configuration including one or more of:
  - an amount of memory or buffers to perform one or more beam measurements; and
  - an amount of processing resources to perform one or more beam measurements; and scheduling to perform one or more beam measurements;
- the configuration further including:
  - an allocation of a first number of beam measurements for all configured component carriers (CCs) with a first discontinuous reception (DRX) configuration;
  - an allocation of a second number of beam measurements for all configured CCs with a second discontinuous reception (DRX) configuration;
  - an allocation of a first resource for the beam measurement of the SCC based on the type of serving carrier of the serving cell being a component carrier of a SCC, and the wireless device determining that a PCC or PSCC is configured; and
  - an allocation of a second resource for the beam measurement of the SCC based on the type of serving carrier of the serving cell being a component carrier of a SCC, and the wireless device determining that no PCC or PSCC is configured; and
- receiving information associated with the one or more beam measurements, the one or more beam measurements being performed based on the configuration and the type of serving carrier.

* * * * *